United States Patent
Du et al.

(10) Patent No.: US 11,895,007 B2
(45) Date of Patent: Feb. 6, 2024

(54) FORWARDING PATH DETERMINING METHOD, APPARATUS, AND SYSTEM

(71) Applicant: Huawei Technologies Co., Ltd., Shenzhen (CN)

(72) Inventors: Zongpeng Du, Shenzhen (CN); Jie Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 17/388,137

(22) Filed: Jul. 29, 2021

(65) Prior Publication Data

US 2021/0359930 A1  Nov. 18, 2021

Related U.S. Application Data

(63) Continuation of application No. PCT/CN2020/071364, filed on Jan. 10, 2020.

(30) Foreign Application Priority Data

Jan. 30, 2019 (CN) .......................... 201910094030.6

(51) Int. Cl.
*H04L 12/721* (2013.01)
*H04L 45/12* (2022.01)
*H04L 45/02* (2022.01)

(52) U.S. Cl.
CPC .............. *H04L 45/12* (2013.01); *H04L 45/02* (2013.01)

(58) Field of Classification Search
CPC ......... H04L 45/02; H04L 45/12; H04L 45/34; H04L 45/64

(Continued)

(56) References Cited

U.S. PATENT DOCUMENTS 9,929,919 B2 * 3/2018 Zhao .................. H04L 41/122
2014/0098675 A1 4/2014 Frost et al.
(Continued)

FOREIGN PATENT DOCUMENTS

CN 103905318 A 7/2014
CN 107968752 A 4/2018
(Continued)

OTHER PUBLICATIONS

SoftBank Corp., "Pseudo-CR on SRv6 Impact on N4", 3GPP TSG CT WG4 Meeting #86-bis, C4-187224, Vilnius, Lithuania, Oct. 15-19, 2018, 3 pages.
(Continued)

*Primary Examiner* — Robert J Lopata
(74) *Attorney, Agent, or Firm* — Conley Rose, P.C.

(57) ABSTRACT

A forwarding path determining method includes: determining, by a path computation node, a first SR-BE forwarding path from a first node to a second node in a first virtual network; determining a second SR-BE forwarding path from the first node to the second node in a physical network; and when the first SR-BE forwarding path completely overlaps the second SR-BE forwarding path, determining the first SR-BE forwarding path as a target forwarding path from the first node to the second node in the first virtual network; or when the first SR-BE forwarding path does not completely overlap the second SR-BE forwarding path, determining, by the path computation node, a first SR-TE forwarding path according to the physical network and the first virtual network, and determining the first SR-TE forwarding path as a target forwarding path from the first node to the second node in the first virtual network.

20 Claims, 11 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0207724 A1 | 7/2015 | Choudhury et al. | |
| 2016/0269325 A1* | 9/2016 | Zhou | H04L 49/70 |
| 2018/0131615 A1* | 5/2018 | Zhang | H04L 45/50 |
| 2018/0351862 A1 | 12/2018 | Jeganathan et al. | |
| 2020/0128445 A1 | 4/2020 | Dong et al. | |
| 2020/0296025 A1* | 9/2020 | Wang | H04L 12/4633 |
| 2021/0119917 A1* | 4/2021 | Yu | H04L 45/12 |
| 2021/0167994 A1* | 6/2021 | Du | H04L 45/586 |
| 2021/0377155 A1* | 12/2021 | Chen | H04L 45/02 |

FOREIGN PATENT DOCUMENTS

| | | |
|---|---|---|
| CN | 108989202 A | 12/2018 |
| CN | 109218201 A | 1/2019 |
| GB | 2443549 A | 5/2008 |
| WO | 2019001350 A1 | 1/2019 |

OTHER PUBLICATIONS

Ginsberg et al., "IS-IS Extensions to Support Routing over IPv6 Dataplane" draft-bashandy-isis-srv6-extensions-03.xt, Networking Working Group, Jun. 29, 2018, 22 pages.

* cited by examiner

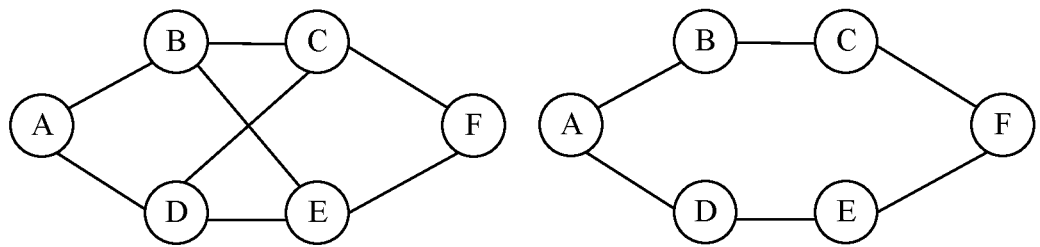
FIG. 4A                  FIG. 4B
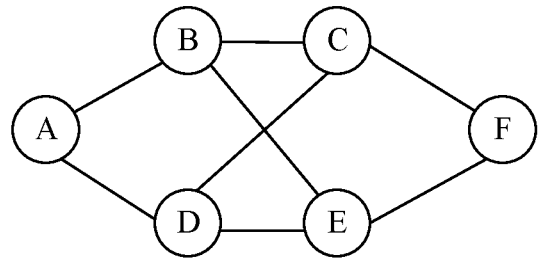
FIG. 5

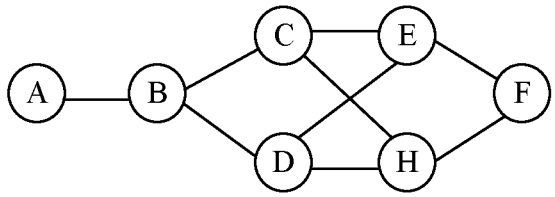
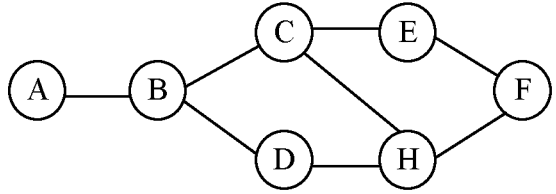

FIG. 7A                    FIG. 7B

```
┌─────────────────────────────────────────────────────┐
│ After a first forwarding node obtains link status   │
│ information of a physical network and link status   │
│ information of a first virtual network, the first   │── S201
│ forwarding node replaces a first main interface     │
│ between the first forwarding node and a next-hop    │
│ node of the first forwarding node with a first      │
│ sub-interface                                       │
└─────────────────────────────────────────────────────┘
                          │
                          ▼
┌─────────────────────────────────────────────────────┐
│ The first forwarding node generates a forwarding    │── S202
│ entry to a second node in the first virtual network │
└─────────────────────────────────────────────────────┘
```

FIG. 8

```
┌─────────────────────────────────────────────────────┐
│ A first forwarding node determines whether a first  │
│ sub-interface corresponding to a first main         │── S2011
│ interface exists in a first virtual network         │
└─────────────────────────────────────────────────────┘
                          │
                          ▼
┌─────────────────────────────────────────────────────┐
│ If the first sub-interface exists, the first        │
│ forwarding node replaces the first main interface   │
│ between the first forwarding node and a next-hop    │── S2012
│ node of the first forwarding node with the          │
│ first sub-interface                                 │
└─────────────────────────────────────────────────────┘
                          │
                          ▼
┌─────────────────────────────────────────────────────┐
│ The first forwarding node generates a forwarding    │── S202
│ entry to a second node in the first virtual network │
└─────────────────────────────────────────────────────┘
```

FIG. 9

FORWARDING PATH DETERMINING METHOD, APPARATUS, AND SYSTEM

CROSS-REFERENCE TO RELATED APPLICATIONS

This is a continuation of Int'l Patent App. No. PCT/CN2020/071364, filed on Jan. 10, 2020, which claims priority to Chinese Patent App. No. 201910094030.6, filed on Jan. 30, 2019, which are incorporated by reference.

FIELD

Embodiments of this disclosure relate to the field of network technologies, and in particular, to a forwarding path determining method, an apparatus, and a system.

BACKGROUND

With development of 5G technologies, network slicing has become an important topic in the field of network technologies. Traffic can be carried on different network slices through the network slicing, to implement resource isolation.

Currently, an effect similar to the network slicing may be implemented by using a multi-topology routing (MTR) technology. The MTR technology means that one physical topology (the physical topology includes a plurality of nodes, for example, a plurality of routers or switches) is divided into a plurality of logical topologies. The physical topology may be denoted as MT0, and the plurality of logical topologies may be denoted as MT1, MT2, (or the physical topology is denoted as Topo0, and the plurality of logical topologies are denoted as Topo1, Topo2, . . . ).

After the network slicing is implemented by using the MTR technology, configurations and path computation (namely, forwarding path determining) of different topologies may be implemented based on Segment Routing over Internet Protocol version 6 (SRv6), so that a data packet is forwarded in a corresponding network slice (namely, a topology). Herein, the SRv6 is a protocol in which a segment routing (SR) technology is applied to an IPv6 network, to forward an IPv6 data packet in the network. In other words, a segment identifier (SID) is represented as an IPv6 address, to forward a data packet in the network.

In the method in which the network slicing and the SRv6 are combined, when a forwarding path of a data packet is to be determined, all nodes (including a provider edge (PE) node and a provider (P) node) in each logical topology (or referred to as a network slice) need to perform path computation. As a result, some nodes perform a large amount of computation, and performance of the nodes deteriorates.

SUMMARY

Embodiments provide a forwarding path determining method, an apparatus, and a system, to reduce a computation amount of a forwarding node and ensure forwarding performance of the forwarding node.

To achieve the foregoing objective, the following technical solutions are used in the embodiments.

According to a first aspect, an embodiment provides a forwarding path determining method, and the method includes: A path computation node determines a first segment routing-best effort (SR-BE) path from a first node to a second node in a first virtual network, where the first node is a start node of data transmission, and the second node is a destination node of the data transmission. The path computation node determines a second SR-BE forwarding path from the first node to the second node in a physical network, where the first virtual network is a virtual network established over the physical network. When the first SR-BE forwarding path completely overlaps the second SR-BE forwarding path, the path computation node determines the first SR-BE forwarding path as a target forwarding path from the first node to the second node in the first virtual network; or when the first SR-BE forwarding path does not completely overlap the second SR-BE forwarding path, the path computation node determines a first segment routing-traffic engineering (SR-TE) forwarding path according to the physical network and the first virtual network, and determines the first SR-TE forwarding path as a target forwarding path from the first node to the second node in the first virtual network.

In this embodiment, all nodes in the physical network compute forwarding paths. In each virtual network, some nodes are configured as P nodes (which are usually intermediate nodes), and the P nodes are defined as forwarding nodes. Some nodes are configured as PE nodes (which are usually network edge nodes and may be used as head nodes of some service paths), and the PE nodes are defined as path computation nodes. To be specific, the PE nodes establish a virtual network topology in the virtual network, compute forwarding paths of the nodes in the virtual network based on the virtual network topology, and generate forwarding entries to a destination node based on a computation result. The P nodes in the virtual network forward only the virtual network topology and link information, but do not establish a virtual network topology, and instead, generate forwarding entries to the destination node in the corresponding virtual network in another manner.

It should be noted that, in this embodiment, a sequence of determining the first SR-BE forwarding path and determining the second SR-BE forwarding path by the path computation node may not be limited. To be specific, the path computation node may first determine the first SR-BE forwarding path, and then determine the second SR-BE forwarding path. Alternatively, the path computation node first determines the second SR-BE forwarding path, and then determines the first SR-BE forwarding path. Alternatively, the path computation node simultaneously determines the first SR-BE forwarding path and the second SR-BE forwarding path.

According to the forwarding path determining method provided in this embodiment, after establishing the first virtual network (which may be a network slice) and configuring the network slice, in a process of determining the forwarding path in the first virtual network, the path computation node in the first virtual network determines the first SR-BE forwarding path from the first node to the second node in the first virtual network, and the path computation node also determines the second SR-BE forwarding path from the first node to the second node in the physical network. The path computation node determines the target forwarding path from the first node to the second node by determining, through comparing, whether the two forwarding paths completely overlap. When the first SR-BE forwarding path completely overlaps the second SR-BE forwarding path, the path computation node determines the first SR-BE forwarding path as the target forwarding path from the first node to the second node. Alternatively, when the first SR-BE forwarding path does not completely overlap the second SR-BE forwarding path, the path computation node determines the first SR-TE forwarding path according to the physical network and the first virtual network, and determines the first SR-TE forwarding path as the target forwarding path from the first node to the second node. In this embodiment, the path computation node in the first virtual network determines a forwarding path, and a forwarding node in the first virtual network does not determine the complete forwarding path. In this way, a computation amount of the forwarding node can be reduced, and forwarding performance of the forwarding node can be ensured.

In a possible implementation, a node in the physical network supports network slicing, and the first virtual network is a network slice over the physical network.

In this embodiment, the first virtual network is a logical network virtualized over the physical network. A plurality of logical networks (or referred to as virtual networks) are virtualized over one physical network by using an MTR technology, to implement network slicing. Each logical network is a network slice. After the path computation node in the first virtual network receives a service request (the service request includes a service type and a start node and a destination node that correspond to a service), the path computation node builds, based on the service request, a forwarding path for forwarding the service. The first node is a start node for transmitting a service in the first virtual network.

In a possible implementation, the path computation node and the first node are a same node, or the path computation node is a network control node that interworks with the first node.

In this embodiment, the path computation node may be the same as the first node. To be specific, in this case, the first node is a PE node, and the path computation node is the first node in the network. Alternatively, the path computation node may be a network control node that interworks with the first network, for example, an SDN controller.

In a possible implementation, the path computation node obtains link status information of the first virtual network, where the link status information of the first virtual network includes a link metric of the first virtual network, a node SID of a node in the first virtual network, and an adjacency SID of a link in the first virtual network. The link status information of the first virtual network is used to determine the target forwarding path.

The link status information of the first virtual network may further include an identifier of the first virtual network, SRv6 locator (LOC) address information of a node in the first virtual network, and the like.

In a possible implementation, the path computation node further obtains link status information of the physical network. The link status information of the physical network includes a link metric of the physical network, a node SID of a node in the physical network, SRv6 LOC address information of a node in the physical network, and an adjacency SID of a link in the physical network. The link status information of the virtual network is used to determine the target forwarding path.

It should be noted that, in this embodiment, a sequence of obtaining the link status information of the physical network by the path computation node and obtaining the link status information of the first virtual network by the path computation node may not be limited. The path computation node may first obtain the link status information of the physical network, and then obtains the link status information of the first virtual network. Alternatively, the path computation node first obtains the link status information of the first virtual network, and then obtains the link status information of the physical network. Alternatively, the path computation node simultaneously obtains the link status information of the physical network and the link status information of the first virtual network.

In a possible implementation, when the path computation node obtains the link status information of the first virtual network, a method for determining the first SR-BE forwarding path from the first node to the second node in the first virtual network may specifically include: The path computation node determines nodes on the first SR-BE forwarding path from the first node to the second node based on the link metric of the first virtual network, and the path computation node writes a node SID of the second node in the first virtual network into an address space corresponding to the first SR-BE forwarding path.

In this embodiment, the path computation node may compute a shortest path from one node to another node according to a shortest path algorithm (for example, Dijkstra). Specifically, a link metric of a link between a node and a next node of the node determines a cost (cost or expense) of a path between the two nodes. A larger link metric indicates a higher path cost. In the first virtual network, the first SR-BE forwarding path from the first node to the second node may be determined according to a principle that a sum of link metrics of all possible links from the first node to the second node is smallest. That is, the first SR-BE forwarding path is a shortest path.

After the path computation node determines the first SR-BE forwarding path, because the first SR-BE forwarding path is the shortest path from the first node to the second node, the path computation node may write only the node SID of the second node (namely, the destination node) into the address space (which may be denoted as an SID list) corresponding to the first SR-BE forwarding path. The address space corresponding to the first SR-BE forwarding path may be a destination address space. The node SID of the second node is encapsulated into a destination address. During data forwarding, data may be forwarded, along the shortest path based on the SID in the destination address, to the node corresponding to the SID in the destination address. It should be noted that the node SID of the second node written into the address space corresponding to the first SR-BE forwarding path is a destination SRv6 SID of the second node (for example, the node SID of the second node is of a function type corresponding to END.DT4, and is a node SID corresponding to a service requirement).

In a possible implementation, a method in which the path computation node determines the first SR-TE forwarding path according to the physical network and the first virtual network may specifically include: The path computation node determines nodes on the first SR-TE forwarding path, where the nodes on the first SR-TE forwarding path are the same as the nodes on the first SR-BE forwarding path. The path computation node determines a to-be-processed node, where the to-be-processed node is the 1st node that is on an SR-BE forwarding path from a first anchor node to the second node in the first virtual network and that is not on an SR-BE forwarding path from the first anchor node to the second node in the physical network, and the first anchor node is a node in the first virtual network. The path computation node writes an adjacency SID of a link between a previous-hop node of the to-be-processed node and the to-be-processed node on the first SR-BE forwarding path into an address space corresponding to the first SR-TE forwarding path. If the to-be-processed node is the second node, the path computation node writes the node SID of the second node in the first virtual network into the address space corresponding to the first SR-TE forwarding path. The path computation node determines the first SR-TE forwarding path.

It should be noted that, in this embodiment, initially, the first anchor node is the first node.

In this embodiment, the path computation node writes the adjacency SID of the link between the previous-hop node of the to-be-processed node and the to-be-processed node on the first SR-BE forwarding path into the address space corresponding to the first SR-TE forwarding path. In this way, the target forwarding path may be limited to pass through the link between the previous-hop node of the to-be-processed node and the to-be-processed node.

In a possible implementation, if the to-be-processed node is not the second node, the forwarding path determining method provided in this embodiment may further include: The path computation node determines an SR-BE forwarding path from the to-be-processed node to the second node in the physical network. In addition, if the SR-BE forwarding path from the to-be-processed node to the second node in the physical network completely overlaps an SR-BE forwarding path from the to-be-processed node to the second node in the first virtual network, the path computation node writes the node SID of the second node in the first virtual network into the address space corresponding to the first SR-TE forwarding path. The path computation node determines the first SR-TE forwarding path.

In a possible implementation, if the SR-BE forwarding path from the to-be-processed node to the second node in the physical network does not completely overlap the SR-BE forwarding path from the to-be-processed node to the second node in the first virtual network, the forwarding path determining method provided in this embodiment may further include: The path computation node determines the to-be-processed node as a second anchor node. The path computation node determines a to-be-processed node, where the to-be-processed node is the 1st node that is on an SR-BE forwarding path from the currently determined second anchor node to the second node in the first virtual network and that is not on an SR-BE forwarding path from the second anchor node to the second node in the physical network. The path computation node writes an adjacency SID of a link between a previous-hop node of the to-be-processed node and the to-be-processed node on the first SR-BE forwarding path into the address space corresponding to the first SR-TE forwarding path. If the to-be-processed node is the second node, the path computation node writes the node SID of the second node in the first virtual network into the address space corresponding to the first SR-TE forwarding path. The path computation node determines the first SR-TE forwarding path.

In this embodiment, SIDs written into the address space corresponding to the first SR-TE forwarding path are not all SIDs (including a node SID and an adjacent SID) on the first SR-TE forwarding path, but it is determined that some necessary SIDs are written into the address space corresponding to the first SR-TE forwarding path. In this way, the address space corresponding to the first SR-TE forwarding path can have a relatively small label stack depth and relatively low forwarding path overheads.

In this embodiment, if the path computation node is not a network controller but a start node in a network, in other words, if the path computation node is denoted as the first node, after the path computation node determines the target forwarding path, the path computation node generates a forwarding entry to the second node in the first virtual network. The forwarding entry includes SRv6 LOC address information of the second node in the first virtual network and indication information of an outbound interface from the path computation node to a next-hop node of the path computation node in the first virtual network.

According to a second aspect, an embodiment provides a forwarding path determining method, and the method includes: After a first forwarding node obtains link status information of a physical network and link status information of a first virtual network, the first forwarding node replaces a first main interface between the first forwarding node and a next-hop node of the first forwarding node with a first sub-interface, where the first main interface is an interface between the first forwarding node and the next-hop node of the first forwarding node in the physical network, the first sub-interface is an interface between the first forwarding node and a next-hop node of the first forwarding node in the first virtual network, and the first virtual network is a virtual network established over the physical network. The first forwarding node generates a forwarding entry to a second node in the first virtual network, where the forwarding entry includes indication information of the first sub-interface, and the second node is a destination node of data transmission.

The link status information of the physical network that is obtained by the first forwarding node may include indication information of a main interface between the first forwarding node and another node, and the link status information of the first virtual network that is obtained by the first forwarding node may include indication information of a sub-interface between the first forwarding node and another node.

In this embodiment, because a forwarding node in the first virtual network does not perform path computation, and the forwarding node performs path computation in the physical network, the forwarding node does not perceive the virtual network but perceives only the physical network. For the first forwarding node in the first virtual network, an interface between the first forwarding node and the next-hop node of the first forwarding node is a main interface (namely, the first main interface) by default. In the first virtual network, the first main interface needs to be replaced with the sub-interface (namely, the first sub-interface) between the first forwarding node and the next-hop node of the first forwarding node in the first virtual network. In this way, during data transmission in the first virtual network, the first forwarding node may transmit data to the next-hop node of the first forwarding node through the first sub-interface, so that it can be ensured that data in a virtual network is transmitted in the corresponding virtual network, to implement resource isolation and avoid interference between data transmission in different networks.

In a possible implementation, a node in the physical network supports network slicing, and the first virtual network is a network slice over the physical network.

In a possible implementation, a method in which the first forwarding node determines to replace the first main interface between the first forwarding node and the next-hop node of the first forwarding node with the first sub-interface may specifically include: The first forwarding node determines whether the first sub-interface corresponding to the first main interface exists in the first virtual network. If the first sub-interface exists, the first forwarding node replaces the first main interface between the first forwarding node and the next-hop node of the first forwarding node with the first sub-interface.

Optionally, in this embodiment, resource isolation configuration (or referred to as interface configuration) is performed during virtual network configuration. For a link in a virtual network, an isolated bandwidth resource is constructed by using a FlexE technology or a channelized sub-interface technology, a main interface and a sub-interface that correspond to each other are configured, and in addition, identifiers of networks corresponding to the main interface and the sub-interface are configured. For example, the network corresponding to the main interface is configured as a physical network (the identifier is MT0; optionally, the identifier of the physical network may not be configured, and the network corresponding to the main interface is the physical network by default). A network corresponding to a sub-interface 1 is configured as the first virtual network (an identifier of the first virtual network is MT1), and a network corresponding to a sub-interface 2 is configured as a second virtual network (an identifier of the second virtual network is MT2).

In this embodiment, the first forwarding node determines, through searching based on the first main interface, whether the corresponding sub-interface (the first sub-interface) in the first virtual network is configured. If the first sub-interface is configured, the first forwarding node determines that the first sub-interface corresponding to the first main interface exists. If the first sub-interface is not configured, the first forwarding node determines that the first sub-interface corresponding to the first main interface does not exist.

In a possible implementation, if the first sub-interface does not exist, the first forwarding node does not perform interface replacement, and the first forwarding node does not generate the forwarding entry to the second node, either. Optionally, the first forwarding node forwards, through the first main interface, data to be sent to the second node in the first virtual network.

In a possible implementation, before the first forwarding node replaces the first main interface between the first forwarding node and the next-hop node of the first forwarding node with the first sub-interface, the forwarding path determining method provided in this embodiment further includes: The first forwarding node determines the first main interface.

In a possible implementation, a method in which the first forwarding node determines the first main interface may specifically include: The first forwarding node determines SRv6 LOC address information of the second node in the physical network; and the first forwarding node finds the first main interface based on the SRv6 LOC address information of the second node in the physical network.

First, the first forwarding node determines SRv6 LOC address information corresponding to the second node in the first virtual network, and uses the SRv6 LOC address information as a thread to search for the SRv6 LOC address information, in the physical network, that corresponds to the second node and that matches the SRv6 LOC address information corresponding to the second node in the first virtual network. Therefore, a corresponding outbound interface is found in a routing table based on the SRv6 LOC address information of the second node in the physical network, to find an outbound interface that is of the first forwarding node and that corresponds to the second node.

In a possible implementation, if the SRv6 LOC address information corresponding to the second node in the first virtual network is configured as a subset of the SRv6 LOC address information corresponding to the second node in the physical network, the first forwarding node may directly search a routing table for a corresponding outbound interface based on the SRv6 LOC address information corresponding to the second node in the first virtual network, to find the outbound interface (namely, the first main interface) that is of the first forwarding node and that corresponds to the second node.

In a possible implementation, the link status information of the physical network includes indication information of a main interface between two nodes in the physical network.

Optionally, the link status information of the physical network may further include a link metric of the physical network, a node SID of a node in the physical network, SRv6 LOC address information of a node in the physical network, an adjacency SID of a link in the physical network, and the like.

In a possible implementation, the link status information of the first virtual network includes indication information of a sub-interface between two nodes in the first virtual network.

Optionally, the link status information of the first virtual network may further include an identifier of the first virtual network, a link metric of the first virtual network, a node SID of a node in the first virtual network, SRv6 LOC address information of a node in the first virtual network, an adjacency SID of a link in the first virtual network, and the like.

In conclusion, it may be understood that, in this embodiment, after configuring the physical network and each virtual network, all forwarding nodes in the network replace all interfaces, and generate a forwarding entry to a destination node in a virtual network. Therefore, after determining a target forwarding path, a path computation node forwards data based on a sub-interface obtained after the replacement. Alternatively, after computing a target forwarding path in the first virtual network, the path computation node replaces a main interface with a corresponding sub-interface in the first virtual network for a forwarding node on the target forwarding path, and then generates a forwarding entry to a destination node, for data forwarding.

Further, according to the forwarding path determining method provided in this embodiment, when nodes in the first virtual network are some nodes in the physical network, or when links in the first virtual network are some links in the physical network, or when the link metric of the first virtual network is different from the link metric of the physical network, a problem that data cannot be completely forwarded in the first virtual network or a problem that data is incorrectly forwarded in the first virtual network caused due to an interface replacement failure or an interface replacement error can be avoided.

According to the forwarding path determining method provided in this embodiment, the forwarding nodes in the first virtual network replace interfaces between nodes. For one (referred to as the first forwarding node) of the forwarding nodes, the first forwarding node determines to replace the first main interface between the first forwarding node and the next-hop node of the first forwarding node with the first sub-interface. The first main interface is an interface between the first forwarding node and the next-hop node of the first forwarding node in the physical network, and the first sub-interface is an interface between the first forwarding node and the next-hop node of the first forwarding node in the first virtual network. In this way, after determining the target forwarding path in the first virtual network, the path computation node may generate the forwarding entry to the destination node in the corresponding network slice through sub-interface replacement. In this way, the forwarding node does not need to compute the target forwarding path, to reduce computation amounts of the forwarding node, and ensure forwarding performance of the forwarding node.

According to a third aspect, an embodiment provides a path computation node, including a first determining module and a second determining module. The first determining module is configured to determine a first SR-BE forwarding path from a first node to a second node in a first virtual network, where the first node is a start node of data transmission, and the second node is a destination node of the data transmission. The first determining module is further configured to determine a second SR-BE forwarding path from the first node to the second node in a physical network, where the first virtual network is a virtual network established over the physical network. The second determining module is configured to: when the first SR-BE forwarding path completely overlaps the second SR-BE forwarding path, determine the first SR-BE forwarding path as a target forwarding path from the first node to the second node in the first virtual network. The second determining module is alternatively configured to: when the first SR-BE forwarding path does not completely overlap the second SR-BE forwarding path, determine a first SR-TE forwarding path according to the physical network and the first virtual network, and determine the first SR-TE forwarding path as a target forwarding path from the first node to the second node in the first virtual network.

In a possible implementation, a node in the physical network supports network slicing, and the first virtual network is a network slice over the physical network.

In a possible implementation, the path computation node and the first node are a same node, or the path computation node is a network control node that interworks with the first node.

In a possible implementation, the path computation node provided in this embodiment further includes an obtaining module. The obtaining module is configured to obtain link status information of the first virtual network, where the link status information of the first virtual network includes a link metric of the first virtual network, a node SID of a node in the first virtual network, and an adjacency SID of a link in the first virtual network. The link status information of the first virtual network is used to determine the target forwarding path.

The link status information of the first virtual network may further include an identifier of the first virtual network, SRv6 LOC address information of a node in the first virtual network, and the like.

In a possible implementation, the obtaining module is further configured to obtain link status information of the physical network. The link status information of the physical network includes a link metric of the physical network, a node SID of a node in the physical network, SRv6 LOC address information of a node in the physical network, and an adjacency SID of a link in the physical network. The link status information of the virtual network is used to determine the target forwarding path.

In a possible implementation, the first determining module is configured to determine nodes on the first SR-BE forwarding path from the first node to the second node based on the link metric of the first virtual network, and write a node SID of the second node in the first virtual network into an address space corresponding to the first SR-BE forwarding path.

In a possible implementation, the second determining module is configured to determine nodes on the first SR-TE forwarding path, where the nodes on the first SR-TE forwarding path are the same as the nodes on the first SR-BE forwarding path; determine a to-be-processed node, where the to-be-processed node is the 1st node that is on an SR-BE forwarding path from a first anchor node to the second node in the first virtual network and that is not on an SR-BE forwarding path from the first anchor node to the second node in the physical network, and the first anchor node is a node in the first virtual network; write an adjacency SID of a link between a previous-hop node of the to-be-processed node and the to-be-processed node on the first SR-BE forwarding path into an address space corresponding to the first SR-TE forwarding path; and if the to-be-processed node is the second node, write the node SID of the second node in the first virtual network into the address space corresponding to the first SR-TE forwarding path.

In a possible implementation, if the to-be-processed node is not the second node, the second determining module is further configured to determine an SR-BE forwarding path from the to-be-processed node to the second node in the physical network; and if the SR-BE forwarding path from the to-be-processed node to the second node in the physical network completely overlaps an SR-BE forwarding path from the to-be-processed node to the second node in the first virtual network, write the node SID of the second node in the first virtual network into the address space corresponding to the first SR-TE forwarding path.

In a possible implementation, if the SR-BE forwarding path from the to-be-processed node to the second node in the physical network does not completely overlap the SR-BE forwarding path from the to-be-processed node to the second node in the first virtual network, the second determining module is further configured to determine the to-be-processed node as a second anchor node; determine a to-be-processed node, where the to-be-processed node is the 1st node that is on the SR-BE forwarding path from the currently determined second anchor node to the second node in the first virtual network and that is not on the SR-BE forwarding path from the second anchor node to the second node in the physical network; write an adjacency SID of a link between a previous-hop node of the to-be-processed node and the to-be-processed node on the first SR-BE forwarding path into the address space corresponding to the first SR-TE forwarding path; and if the to-be-processed node is the second node, write the node SID of the second node in the first virtual network into the address space corresponding to the first SR-TE forwarding path.

According to a fourth aspect, an embodiment provides a forwarding node, the forwarding node is a first forwarding node, and the forwarding node includes an interface replacement module and a generation module. The interface replacement module is configured to: after the first forwarding node obtains link status information of a physical network and link status information of a first virtual network, replace a first main interface between the first forwarding node and a next-hop node of the first forwarding node with a first sub-interface, where the first main interface is an interface between the first forwarding node and the next-hop node of the first forwarding node in the physical network, the first sub-interface is an interface between the first forwarding node and a next-hop node of the first forwarding node in the first virtual network, and the first virtual network is a virtual network established over the physical network. The generation module is configured to generate a forwarding entry to a second node in the first virtual network, where the forwarding entry includes indication information of the first sub-interface, and the second node is a destination node of data transmission.

In a possible implementation, a node in the physical network supports network slicing, and the first virtual network is a network slice over the physical network.

In a possible implementation, the interface replacement module is configured to determine whether the first sub-interface corresponding to the first main interface exists in the first virtual network; and if the first sub-interface exists, replace the first main interface between the first forwarding node and the next-hop node of the first forwarding node with the first sub-interface.

In a possible implementation, the forwarding node provided in this embodiment further includes a determining module, and the determining module is configured to determine the first main interface.

In a possible implementation, the determining module is configured to determine SRv6 LOC address information of the second node in the physical network, and find the first main interface based on the SRv6 LOC address information of the second node in the physical network.

In a possible implementation, the link status information of the physical network includes indication information of a main interface between two nodes in the physical network.

Optionally, the link status information of the physical network may further include a link metric of the physical network, a node SID of a node in the physical network, SRv6 LOC address information of a node in the physical network, an adjacency SID of a link in the physical network, and the like.

In a possible implementation, the link status information of the first virtual network includes indication information of a sub-interface between two nodes in the first virtual network.

Optionally, the link status information of the first virtual network may further include an identifier of the first virtual network, a link metric of the first virtual network, a node SID of a node in the first virtual network, SRv6 LOC address information of a node in the first virtual network, an adjacency SID of a link in the first virtual network, and the like.

According to a fifth aspect, an embodiment provides a path computation node, including a processor and a memory coupled to the processor. The memory is configured to store a computer instruction. When the path computation node runs, the processor executes the computer instruction stored in the memory, so that the path computation node performs the forwarding path determining method according to any one of the first aspect and the possible implementations of the first aspect.

According to a sixth aspect, an embodiment provides a computer readable storage medium. The computer readable storage medium may include a computer instruction, and when the computer instruction is run on a computer, the computer is enabled to perform the forwarding path determining method according to any one of the first aspect and the possible implementations of the first aspect.

According to a seventh aspect, an embodiment provides a computer program product including a computer instruction. When the computer program product is run on a computer, a path computation node is enabled to perform the forwarding path determining method according to any one of the first aspect and the possible implementations of the first aspect.

According to an eighth aspect, an embodiment provides a path computation node. The path computation node exists in the product form of a chip, a structure of the path computation node includes a processor and a memory, the memory is configured to be coupled to the processor, and the memory may be configured to store a computer instruction. The processor is configured to execute the computer instruction stored in the memory, so that the path computation node performs the forwarding path determining method according to any one of the first aspect and the possible implementations of the first aspect.

According to a ninth aspect, an embodiment provides a forwarding node, including a processor and a memory coupled to the processor. The memory is configured to store a computer instruction. When the forwarding node runs, the processor executes the computer instruction stored in the memory, so that the forwarding node performs the forwarding path determining method according to any one of the second aspect and the possible implementations of the second aspect.

According to a tenth aspect, an embodiment provides a computer readable storage medium. The computer readable storage medium may include a computer instruction, and when the computer instruction is run on a computer, a forwarding node is enabled to perform the forwarding path determining method according to any one of the second aspect and the possible implementations of the second aspect.

According to an eleventh aspect, an embodiment provides a computer program product including a computer instruction. When the computer program product is run on a computer, a forwarding node is enabled to perform the forwarding path determining method according to any one of the second aspect and the possible implementations of the second aspect.

According to a twelfth aspect, an embodiment provides a forwarding node. The forwarding node exists in the product form of a chip, a structure of the forwarding node includes a processor and a memory, the memory is configured to be coupled to the processor, and the memory may be configured to store a computer instruction. The processor is configured to execute the computer instruction stored in the memory, so that the forwarding node performs the forwarding path determining method according to any one of the second aspect and the possible implementations of the second aspect.

According to a thirteenth aspect, an embodiment provides a communications system, including one or more path computation nodes according to the third aspect or the fifth aspect and one or more forwarding nodes according to the fourth aspect or the ninth aspect.

It may be understood that, the path computation node according to the third aspect, the fifth aspect, and the eighth aspect, the forwarding node according to the fourth aspect, the ninth aspect, and the twelfth aspect, the computer storage medium according to the sixth aspect and the tenth aspect, the computer program product according to the seventh aspect and the eleventh aspect, and the communications system according to the thirteenth aspect are all configured to perform the corresponding method provided above. Therefore, for beneficial effects that can be achieved, refer to the beneficial effects in the corresponding method provided above. Details are not described herein again.

BRIEF DESCRIPTION OF THE DRAWINGS

FIG. 4A and FIG. 4B are schematic diagrams of topologies of a first virtual network according to an embodiment.

FIG. 5 is a schematic diagram of a topology of a physical network according to an embodiment.

FIG. 7A and FIG. 7B are a schematic diagram 2 of network topologies according to an embodiment.

FIG. 8 is a schematic diagram 4 of a forwarding path determining method according to an embodiment.

FIG. 9 is a schematic diagram 5 of a forwarding path determining method according to an embodiment.

DETAILED DESCRIPTION

The term "and/or" in this specification describes only an association relationship for describing associated objects and represents that three relationships may exist. For example, A and/or B may represent the following three cases: only A exists, both A and B exist, and only B exists.

In the specification and claims in the embodiments, the terms "first", "second", and so on are intended to distinguish between different objects but do not indicate a particular order of the objects. For example, a first node, a second node, and the like are used to distinguish different nodes, but do not indicate a particular order of the nodes.

In the embodiments, the word "example" or "for example" is used to represent giving an example, an illustration, or a description. Any embodiment or design scheme described as an "example" or "for example" in the embodiments should not be explained as being more preferred or having more advantages than another embodiment or design scheme. Exactly, use of the word "example", "for example" or the like is intended to present a related concept in a specific manner.

In descriptions of the embodiments, unless otherwise stated, "a plurality of" means at least two. For example, a plurality of processing units are two or more processing units. A plurality of systems are two or more systems.

Some concepts related to a forwarding path determining method, an apparatus, and a system provided in the embodiments are first described.

A network slice is a logical network virtualized over a physical network. A network slice is a virtual network. In the embodiments, a plurality of logical networks (or referred to as virtual networks) are virtualized in one physical network by using an MTR technology, to implement network slicing. Each logical network is a network slice.

Figure 1A:
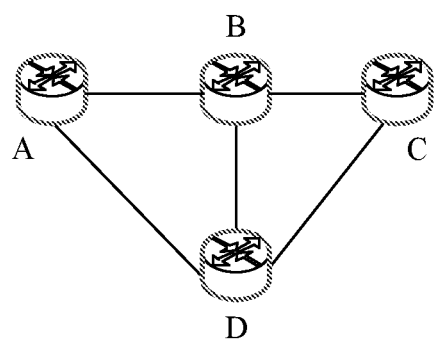
FIG. 1A to FIG. 1C are a schematic diagram 1 of network topologies according to an embodiment.
Figure 1B:
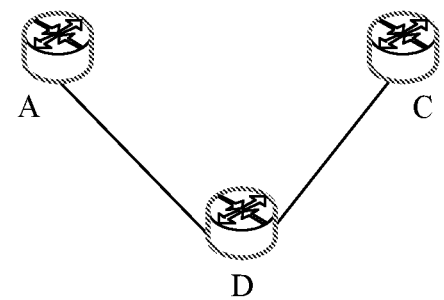
Figure 1C:
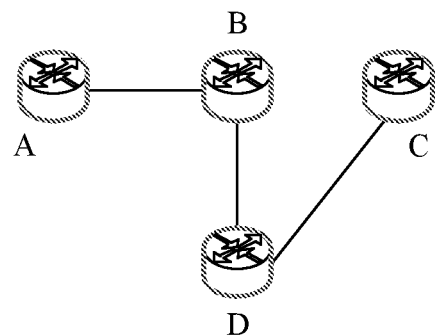

For example, in network topologies shown in FIG. 1A to FIG. 1C, FIG. 1A shows a physical topology (denoted as MT0), and FIG. 1B and FIG. 1C show two network slices (denoted as MT1 and MT2) virtualized in a physical network. It can be learned that the network slice may include some or all nodes in the physical network. For example, the MT1 includes some nodes (three nodes) in the physical network, and the MT2 includes all nodes (four nodes) in the physical network.

A path computation node is a node that computes a forwarding path in a network. The path computation node may be a network control node in the network. For example, the network control node may be a software-defined networking (SDN) controller. The path computation node may alternatively be another node (including a PE node and a P node) in the network. Usually, all nodes in the network participate in forwarding path computation.

It should be noted that in the embodiments, all nodes in a physical network compute forwarding paths. In a network slice, some nodes are configured as P nodes (which are usually intermediate nodes), and the P nodes are defined as forwarding nodes. Some nodes are configured as PE nodes (which are usually network edge nodes and may be used as head nodes of some service paths), and the PE nodes are defined as path computation nodes. To be specific, the PE nodes establish a network slice topology in the network slice, compute forwarding paths of the nodes in the network slice based on the network slice topology, and generate forwarding entries to a destination node based on a computation result. The P nodes forward only the network slice topology and link information, but do not establish a network slice topology, and instead, generate forwarding entries to the destination node in the corresponding network slice in another manner.

SRv6 is a protocol in which an SR technology is applied to an IPv6 network, to forward an IPv6 data packet in the network. In other words, an SID is represented as an IPv6 address, to forward the IPv6 data packet in the IPv6 network. SIDs in a network include node SIDs and adjacency SIDs. A forwarding path can be built based on node SIDs and/or adjacency SIDs of links, to guide data or traffic forwarding.

In the embodiments, in different networks, each node maintains a local SID space (denoted as a local SID space), and a node SID of the node and an adjacency SID related to the node fall within a range of the local SID space. These SIDs are stored in a local SID table. The local SID table includes a node SID of the node, a function type of the SID (to be specific, a function specifically performed by the SID), a subsequent action of the SID, and the like. For example, Table 1 is an example of content included in an entry of a local SID table of a node.

TABLE 1

A2:1::B100
END.DT4
IPv4 L3VPN(VRF 100)

A2:1::B100 is a SID of the node, A2:1 is a prefix of the SID of the node, and B100 is FUNC function information of the SID. In Table 1, B100 indicates the node to forward a data packet to VRF 100 when the node receives the data packet. END.DT4 is a function type of the SID. IPv4 L3VPN (VRF 100) is a subsequent action of the SID. In Table 1, END.DT4 indicates the node to forward a data packet to IPv4 L3VPN. In conclusion, it may be learned from the local SID table shown in Table 1 that the node needs to forward the data packet to the VRF 100 in the IPv4 L3VPN.

In the embodiments, for a node, a corresponding IPv6 prefix in a local SID space of the node is usually used as SRv6 LOC address information (or referred to as a locator of the node) of the node, and a following part is used as SRv6 FUNC function information (or referred to as a function of the node) of each node. The LOC address information is used for addressing, and the FUNC function information is used to indicate a specific function to be performed.

For example, for a node A, a node SID of the node A includes 128 bits. The first 64 bits may be used as SRv6 LOC address information of the node A, and are denoted as A1:1::/64, the last 64 bits are used as the SRv6 FUNC function information of the node A.

It should be noted that, a same node has different node SIDs and different link adjacency SIDs in different networks (for example, a physical network and different network slices, or referred to as different topologies). Different node SIDs and link adjacency SIDs are allocated to different networks, to ensure that different traffic is forwarded in different networks and does not interfere with each other.

In the embodiments, a flexible Ethernet (FlexE) technology or a channelized sub-interface technology may be used to isolate resources of different networks. To be specific, one physical interface is virtualized into a plurality of logical interfaces, and different logical interfaces correspond to different network slices. For example, a bandwidth of one physical interface is divided into bandwidths of several virtual interfaces by using the FlexE technology. Assuming that both a router 1 and a router 2 are located in each of three network slices (which are a slice 1, a slice 2, and a slice 3), one physical interface between the router 1 and the router 2 is divided into three FlexE interfaces by using the FlexE technology, and one FlexE interface corresponds to one network slice. By using the channelized sub-interface technology, a bandwidth of a physical interface may be divided into bandwidths of a main interface and a plurality of sub-interfaces. Optionally, the main interface may correspond to an interface in the physical network, and the sub-interface may correspond to an interface in a network slice. The bandwidth of the main interface is isolated from the bandwidth of the sub-interface. For example, assuming that both a router 1 and a router 2 are located in three network slices (which are a slice 1, a slice 2, and a slice 3), a physical interface between the router 1 and the router 2 is divided into one main interface and three sub-interfaces by using the channelized sub-interface technology. The three sub-interfaces respectively correspond to the three network slices.

For a problem in the background that a computation amount of a forwarding node is relatively large because all the nodes need to perform path computation, the embodiments provide a forwarding path determining method, an apparatus, and a system. After establishing a first virtual network (which may be a network slice) and configuring the network slice, in a process of determining a forwarding path in the first virtual network, a path computation node in the first virtual network determines a first SR-BE forwarding path from a first node to a second node in the first virtual network, and the path computation node also determines a second SR-BE forwarding path from the first node to the second node in a physical network. The path computation node determines a target forwarding path from the first node to the second node by determining, through comparing, whether the two forwarding paths completely overlap. When the first SR-BE forwarding path completely overlaps the second SR-BE forwarding path, the path computation node determines the first SR-BE forwarding path as the target forwarding path from the first node to the second node. To be specific, the path computation node forwards data corresponding to the first virtual network by using a default shortest-path forwarding mechanism. Alternatively, when the first SR-BE forwarding path does not completely overlap the second SR-BE forwarding path, the path computation node determines a first SR-TE forwarding path according to the physical network and the first virtual network, and determines the first SR-TE forwarding path as the target forwarding path from the first node to the second node. To be specific, the path computation node forwards the data corresponding to the first virtual network through the SR-TE forwarding path instead of a default shortest-path forwarding mechanism. In addition, forwarding nodes in the first virtual network replace interfaces between nodes. For one (referred to as a first forwarding node) of the forwarding nodes, the first forwarding node determines to replace a first main interface between the first forwarding node and a next-hop node of the first forwarding node with a first sub-interface. The first main interface is an interface between the first forwarding node and the next-hop node of the first forwarding node in the physical network, and the first sub-interface is an interface between the first forwarding node and the next-hop node of the first forwarding node in the first virtual network. In this way, forwarding path computation is completed. It can be learned that only the path computation node in the first virtual network determines the forwarding path, and the forwarding node in the first virtual network does not determine a complete forwarding path (to be specific, a network slice topology is first established, a forwarding path of a sliced node is computed based on the network slice topology, and a forwarding entry to a destination node is generated based on a computation result), but generates the forwarding entry to the destination node in the corresponding network slice through sub-interface replacement. In this way, the technical solution provided in the embodiments can reduce a computation amount of a forwarding node, and ensure forwarding performance of the forwarding node.

According to the forwarding path determining method provided in the embodiments, before a forwarding path is computed, the physical network and the network slices are first configured (the physical network and the network slices all support SRv6). Details may include the following:

Step 1: Configure the Physical Network.

In the embodiments, configuring the physical network means performing related configuration on each node in the physical network, for example, including configuring a node SID of the node, SRv6 LOC address information of the node, an adjacency SID of a link related to the node, and a link metric of the link related to the node.

A node 1 and a node 2 in the physical network are used as an example. An adjacent SID of a link between the node 1 and the node 2 is an identifier of the link between the node 1 and the node 2, and the adjacent SID is used to indicate the link between the node 1 and the node 2.

Optionally, configuring the physical network includes configuring indication information of an interface (referred to as a main interface) between two nodes in the physical network.

Optionally, configuring the physical network includes configuring an identifier of the physical network, namely, an identifier of a network corresponding to the main interface. For example, the identifier of the physical network is configured as MT0. Optionally, the identifier of the physical network may not be configured, and the main interface corresponds to the physical network by default.

Step 2: Flood Physical Network Configuration Information to Each Node in the Physical Network.

After each node in the physical network is configured, each node may broadcast (or advertise) configuration information of the node by using an interior gateway protocol (interior gateway protocol, IGP) packet, to flood the configuration information to other nodes in the physical network. A node (referred to as a node 1) in the physical network is used as an example. The node 1 may broadcast configuration information of the node 1. In this way, another node may obtain the configuration information of the node. Similarly, the node 1 may also obtain configuration information of another node. Herein, configuration information of another node that is obtained by a node is referred to as link status information of the physical network. Link status information of the physical network that is obtained by the node 1 includes a link metric of the physical network, a node SID of a node in the physical network, SRv6 LOC address information of a node in the physical network, and an adjacency SID of a link in the physical network.

For example, in the embodiments, the node SID may be advertised in a sub-type-length-value (TLV) format of the following locator TLV (for a specific format, refer to draft-bashandy-isis-srv6-extensions). The SRv6 LOC address information of the node may be advertised in ISIS TLV 236 IPv6 IP.Reach, or may be advertised in an SRv6 locator TLV format of draft-bashandy-isis-srv6-extensions-03. The adjacency SID of the link may be advertised in a sub-TLV format of ISIS TLV 22 extended IS reachability (for a specific format, refer to the draft-bashandy-isis-srv6-extensions). The link metric may be advertised in the format of the ISIS TLV 22 extended IS reachability.

After the physical network configuration information is flooded to all the nodes in the physical network by using an IGP protocol, each node may generate a routing table corresponding to the physical network. For example, a node in the physical network is used as an example. A routing table generated by the node includes a forwarding entry from the node to another node in the physical network, and the forwarding entry specifically includes SRv6 LOC address information of the another node and indication information of an outbound interface from the node to the another node.

Step 3: Configure a Virtual Network.

In the embodiments, configuring the virtual network means performing related configuration on each node in the virtual network (each virtual network), for example, including configuring an identifier of the virtual network, a node SID of the node, SRv6 LOC address information of the node, an adjacency SID of a link related to the node, and a link metric of the link related to the node.

Optionally, in the embodiments, for a same link, a link metric of the link in the first virtual network may be the same as or different from a link metric of the link in the physical network. This is not specifically limited in the embodiments.

Further, configuring the virtual network further includes configuring a path computation node and a forwarding node in a corresponding virtual network, to be specific, defining specific nodes as path computation nodes, and defining specific nodes as forwarding nodes in the virtual network.

Further, configuring the virtual network further includes resource isolation configuration (or referred to as interface configuration). For a link in the virtual network, an isolated bandwidth resource is constructed by using the FlexE technology or the channelized sub-interface technology, a sub-interface corresponding to a main interface is configured, and an identifier of a virtual network corresponding to the sub-interface is configured. A network corresponding to a sub-interface 1 is configured as a first virtual network. For example, an identifier of the first virtual network is configured as MT1. A network corresponding to a sub-interface 2 is configured as a second virtual network. For example, an identifier of the second virtual network is configured as MT2.

Step 4: Flood Network Configuration Information of the Virtual Network to Each Node in the Virtual Network.

Similar to step 2, for the first virtual network, after each node in the first virtual network is configured, each node may broadcast (or advertise) configuration information of the node by using an IGP packet, to flood the configuration information to other nodes in the physical network.

Optionally, for a node in the first virtual network, link status information of the first virtual network that is obtained by the node includes an identifier of the first virtual network, a link metric of the first virtual network, a node SID of a node in the first virtual network, SRv6 LOC address information of a node in the first virtual network, and an adjacency SID of a link in the first virtual network.

For example, in the embodiments, the node SID may be advertised in a sub-TLV format of the following locator TLV (for a specific format, refer to draft-bashandy-isis-srv6-extensions). SRv6 LOC address information of the node may be advertised in an ISIS TLV 237 MT IPv6 IP.Reach TLV, or may be advertised in an SRv6 locator TLV format of draft-bashandy-isis-srv6-extensions-03. An adjacency SID may be advertised in a sub-TLV format of ISIS TLV 222 MT-ISN (for a specific format, refer to the draft-bashandy-isis-srv6-extensions). The link metric may be advertised in the format of the ISIS TLV 222 MT-ISN.

It should be particularly noted that, in the embodiments, after a path computation node obtains the link status information of the virtual network, the path computation node generates the virtual network. This may alternatively be understood as: The path computation node establishes the virtual network, to be specific, generates a virtual network topology and computes a forwarding path to each of other nodes in the network, and generates a forwarding entry to a destination node in the corresponding virtual network. After a forwarding node obtains the link status information of the virtual network, the forwarding node does not generate the virtual network. This may alternatively be understood as: the forwarding node does not generate a virtual network topology, and computes, based on this, forwarding paths to other nodes in the network, but the forwarding node generates a forwarding entry to the destination node in the virtual network.

Optionally, in the embodiments, the networks (including the physical network and the virtual network) may be configured through static configuration (namely, manual configuration). For example, an administrator performs manual configuration by using a configuration interface. The networks may also be configured through dynamic configuration (namely, automatic configuration). The dynamic configuration may be performed by a network controller by delivering configuration information or by running a specific script.

In the embodiments, a plurality of virtual networks may be established over a physical network. The following describes in detail the technical solution in the embodiments by using an example of determining a forwarding path in a virtual network (referred to as a first virtual network below).

Figure 2:
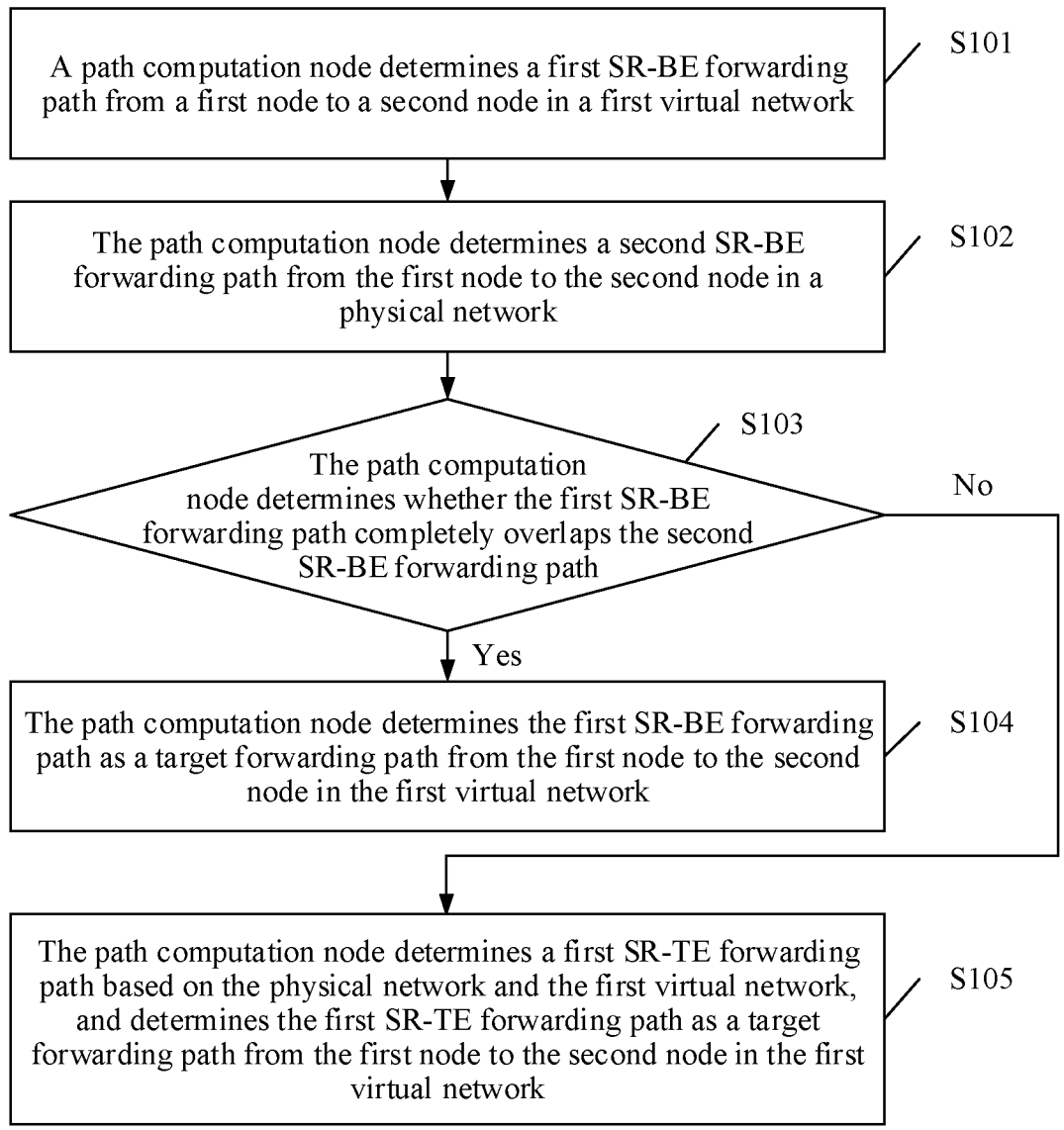
FIG. 2 is a schematic diagram 1 of a forwarding path determining method according to an embodiment.

Based on the configuration of the physical network and the virtual network described in the foregoing embodiment, as shown in FIG. 2, the forwarding path determining method provided in this embodiment may include S101 to S105.

S101. A path computation node determines a first SR-BE forwarding path from a first node to a second node in a first virtual network.

In a specific embodiment, a node in a physical network supports network slicing, and the first virtual network is a network slice over the physical network. In the first virtual network, the first node is a start node of data transmission in the first virtual network, and the second node is a destination node of the data transmission in the first virtual network.

In this embodiment, after the path computation node in the network receives a service request (the service request includes a service type, and a start node and a destination node that correspond to a service during service forwarding in the first virtual network), the path computation node builds, based on the service request, a forwarding path for forwarding the service.

It should be noted that, in this embodiment, the path computation node may be the same as the first node. To be specific, in this case, the first node is a PE node, and the path computation node is the first node in the network. Alternatively, the path computation node may be a network control node that interworks with the first network, for example, an SDN controller.

With reference to related descriptions in the foregoing embodiment, before the path computation node determines the forwarding path in the first virtual network, the path computation node may further first perform the following S100a and S100b.

S100a: The path computation node obtains link status information of the physical network.

In a specific embodiment, the link status information of the physical network includes a link metric of the physical network, a node SID of a node in the physical network, and an adjacency SID of a link in the physical network.

Optionally, the link status information of the physical network may further include SRv6 LOC address information of a node in the physical network and the like.

S100b: The path computation node obtains link status information of the first virtual network.

In a specific embodiment, the link status information of the first virtual network includes a link metric of the first virtual network, a node SID of a node in the first virtual network, and an adjacency SID of a link in the first virtual network.

Optionally, the link status information of the first virtual network may further include an identifier of the first virtual network, SRv6 LOC address information of a node in the first virtual network, and the like.

It should be noted that, in this embodiment, an execution sequence of S100a and S100b may not be limited. To be specific, the path computation node may first perform S100a and then perform S100b, or may first perform S100b and then perform S100a, or may simultaneously perform S100a and S100b.

Figure 3:
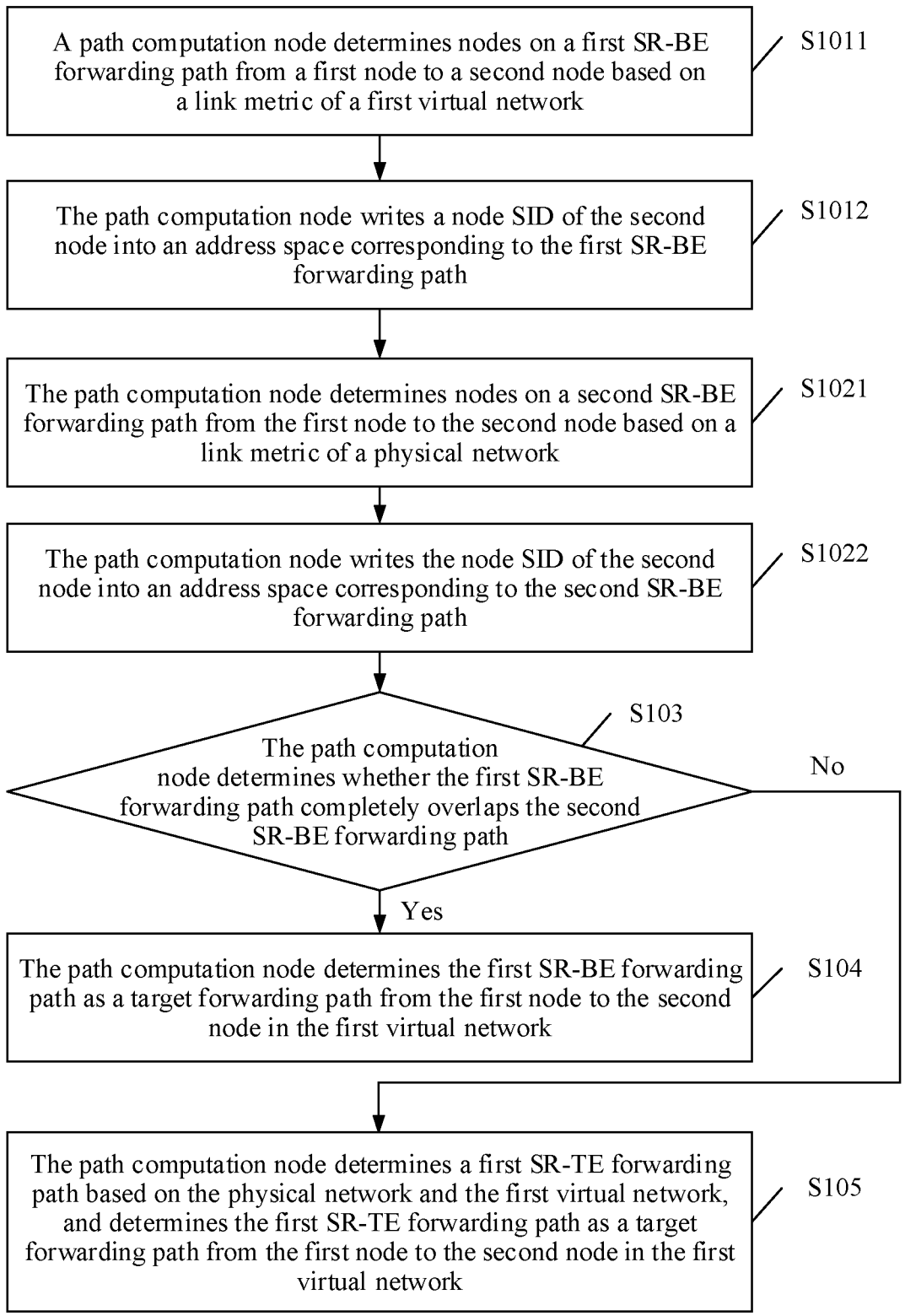
FIG. 3 is a schematic diagram 2 of a forwarding path determining method according to an embodiment.

Optionally, in this embodiment, with reference to FIG. 2, as shown in FIG. 3, S101 may be specifically implemented by using S1011 and S1012.

S1011. The path computation node determines nodes on the first SR-BE forwarding path from the first node to the second node based on the link metric of the first virtual network.

In this embodiment, the path computation node may compute a shortest path from one node to another node according to a shortest path algorithm (for example, Dijkstra). Specifically, a link metric of a link between a node and a next node of the node determines a cost (cost or expense) of a path between the two nodes. A larger link metric indicates a higher path cost. In the first virtual network, the first SR-BE forwarding path from the first node to the second node may be determined according to a principle that a sum of link metrics of all possible links from the first node to the second node is smallest. That is, the first SR-BE forwarding path is a shortest path.

For example, FIG. 4A and FIG. 4B are schematic diagrams of topology structures of the first virtual network. FIG. 4A shows a topology structure, and FIG. 4B shows another topology structure. A node A is the first node, namely, a start node, and a node F is the second node, namely, a destination node. In FIG. 4A and FIG. 4B, if link metrics of a link AB and a link BE are both 10, and link metrics of other links are all 20, in FIG. 4A, it is determined, based on the link metric of the first virtual network, that nodes on a first SR-BE forwarding path from the node A to the node F are successively A, B, E, and F (a sum of link metrics is 10+10+20). In FIG. 4B, it is determined, based on the link metric of the first virtual network, that nodes on a first SR-BE forwarding path from the node A to the node F are successively A, B, C, and F (a sum of link metrics is 10+20+20).

S1012. The path computation node writes a node SID of the second node into an address space corresponding to the first SR-BE forwarding path.

In this embodiment, after the path computation node determines the first SR-BE forwarding path, because the first SR-BE forwarding path is the shortest path from the first node to the second node, the path computation node may write only the node SID of the second node (namely, the destination node) into the address space (which may be denoted as an SID list) corresponding to the first SR-BE forwarding path. The address space corresponding to the first SR-BE forwarding path may be a destination address space. The node SID of the second node is encapsulated into a destination address. During data forwarding, data may be forwarded, along the shortest path based on the SID in the destination address, to the node corresponding to the SID in the destination address.

It should be noted that the node SID of the second node written into the address space corresponding to the first SR-BE forwarding path is a destination SRv6 SID of the second node (for example, the node SID of the second node is of a function type corresponding to END.DT4, and is a node SID corresponding to a service requirement).

For example, for the SR-BE forwarding path A→B→E→F determined in FIG. 4A, the path computation node writes a node SID of the node F into the address space corresponding to the first SR-BE forwarding path. In this way, it can be learned, based on the SID in the address space and a topology (a) of the first virtual network, that the forwarding path is the shortest path from the node A to the node F: A→B→E→F. For the SR-BE forwarding path A→B→C→F determined in FIG. 4B, the path computation node writes the SID of the node F into the address space corresponding to the first SR-BE forwarding path. In this way, it can be learned, based on the SID in the address space and a topology (b) of the first virtual network, that the forwarding path is the shortest path from the node A to the node F: A→B→C→F.

S102. The path computation node determines a second SR-BE forwarding path from the first node to the second node in the physical network.

In this embodiment, similar to S101, for the same path computation node, the SR-BE forwarding path from the first node to the second node is also determined in the physical network, and is referred to as the second SR-BE forwarding path. Specifically, as shown in FIG. 3, S102 may be implemented by using S1021 and S1022.

S1021. The path computation node determines nodes on the second SR-BE forwarding path from the first node to the second node based on the link metric of the physical network.

For example, FIG. 5 is a schematic diagram of a topology structure of the physical network corresponding to the first virtual network shown in FIG. 4A and FIG. 4B. It is assumed that link metrics of a link AB and a link BE are both 10, and link metrics of other links are all 20. In FIG. 5, it is determined, based on the link metric of the physical network, that nodes on the second SR-BE forwarding path from the node A to the node F are successively A, B, E, and F (a sum of link metrics is 10+10+20).

S1022. The path computation node writes the node SID of the second node into an address space corresponding to the second SR-BE forwarding path.

For example, for the SR-BE forwarding path A→B→E→F determined in FIG. 5, the path computation node writes a SID of the node F into the address space corresponding to the second SR-BE forwarding path. In this way, it can be learned, based on the SID in the address space and a topology of the physical network, that the forwarding path is the shortest path from the node A to the node F: A→B→E→F.

It should be noted that, in this embodiment, an execution sequence of S101 and S102 may not be limited. To be specific, the path computation node may first perform S101 and then perform S102, or may first perform S102 and then perform S101, or may simultaneously perform S101 and S102.

S103. The path computation node determines whether the first SR-BE forwarding path completely overlaps the second SR-BE forwarding path.

In this embodiment, the path computation node may determine, based on whether the nodes on the first SR-BE forwarding path are completely the same as the nodes on the second SR-BE forwarding path, whether the first SR-BE forwarding path completely overlaps the second SR-BE forwarding path. If the nodes on the first SR-BE forwarding path are completely the same as the nodes on the second SR-BE forwarding path, it is determined that the first SR-BE forwarding path completely overlaps the second SR-BE forwarding path. If the nodes on the first SR-BE forwarding path are not completely the same as the nodes on the second SR-BE forwarding path, it is determined that the first SR-BE forwarding path does not completely overlap the second SR-BE forwarding path.

With reference to an example in S102, the first SR-BE forwarding path determined by the path computation node in the first virtual network is A→B→E→F, and the second SR-BE forwarding path determined by the path computation node in the physical network is also A→B→E→F. It can be learned that the first SR-BE forwarding path completely overlaps the second SR-BE forwarding path. With reference to another example in S102, the first SR-BE forwarding path determined by the path computation node in the first virtual network is A→B→C→F, and the second SR-BE forwarding path determined by the path computation node in the physical network is A→B→E→F. It can be learned that the first SR-BE forwarding path does not completely overlap the second SR-BE forwarding path.

In this embodiment, when the first SR-BE forwarding path completely overlaps the second SR-BE forwarding path, the path computation node performs S104 below. When the first SR-BE forwarding path does not completely overlap the second SR-BE forwarding path, the path computation node performs S105 below.

S104. The path computation node determines the first SR-BE forwarding path as a target forwarding path from the first node to the second node in the first virtual network.

In this embodiment, determining the first SR-BE forwarding path as the target forwarding path may be understood as forwarding, by using a default shortest-path forwarding mechanism, data corresponding to the first virtual network. Herein, the default shortest-path forwarding mechanism is determining a shortest forwarding path according to a shortest-path algorithm, and the first SR-BE forwarding path is a default shortest forwarding path in the first virtual network.

S105. The path computation node determines a first SR-TE forwarding path according to the physical network and the first virtual network, and determines the first SR-TE forwarding path as the target forwarding path from the first node to the second node in the first virtual network.

In this embodiment, determining the first SR-TE forwarding path as the target forwarding path may be understood as forwarding data corresponding to the first virtual network through the SR-TE forwarding path instead of a default forwarding mechanism.

It should be noted that, in this embodiment, a difference between the SR-BE forwarding path and the SR-TE forwarding path lies in that the SR-BE forwarding path is a shortest forwarding path, but the SR-TE forwarding path is a forwarding path that is specified to pass through a link or links.

Figure 6A:
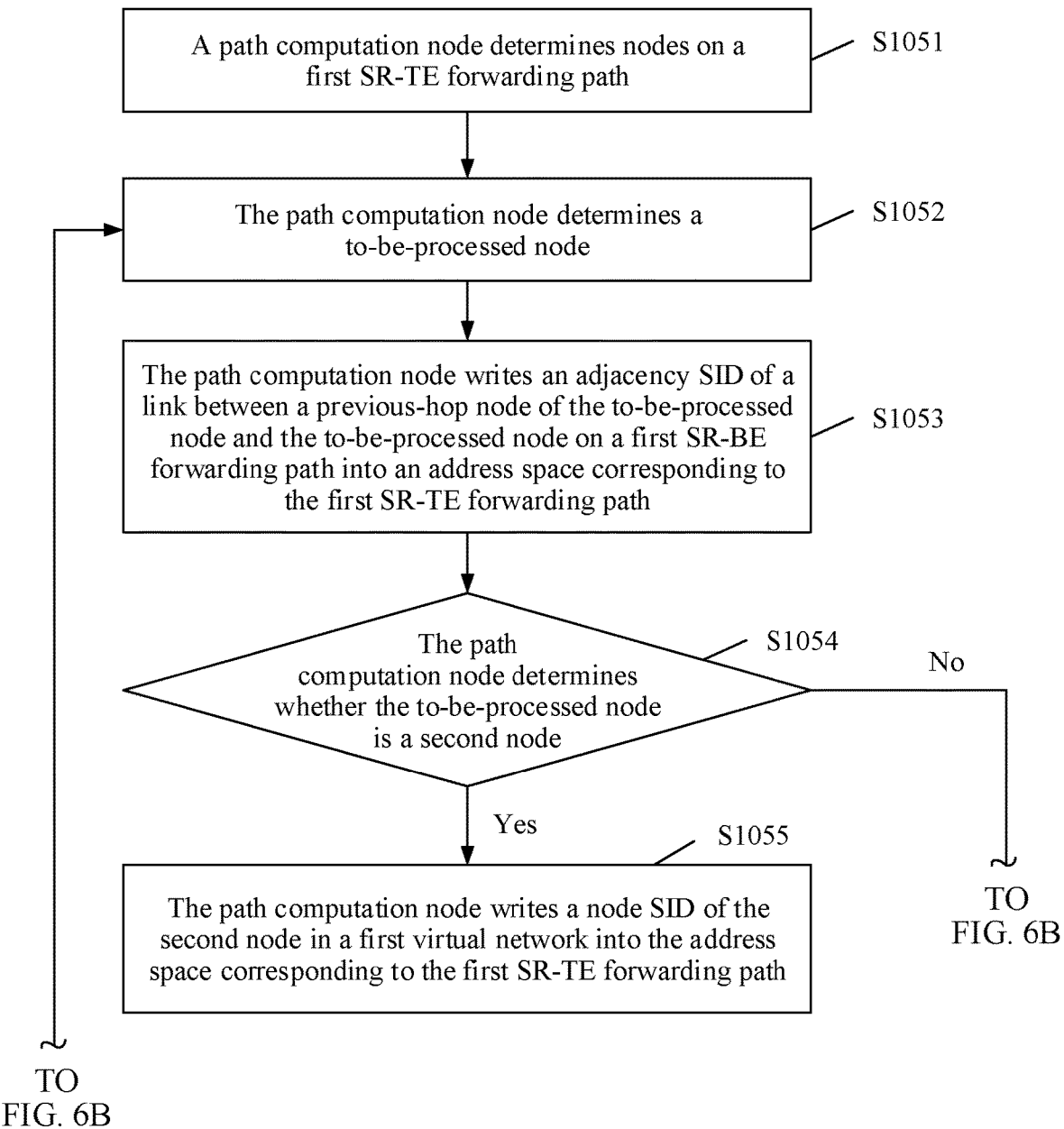
FIG. 6A and FIG. 6B are a schematic diagram 3 of a forwarding path determining method according to an embodiment.
Figure 6B:
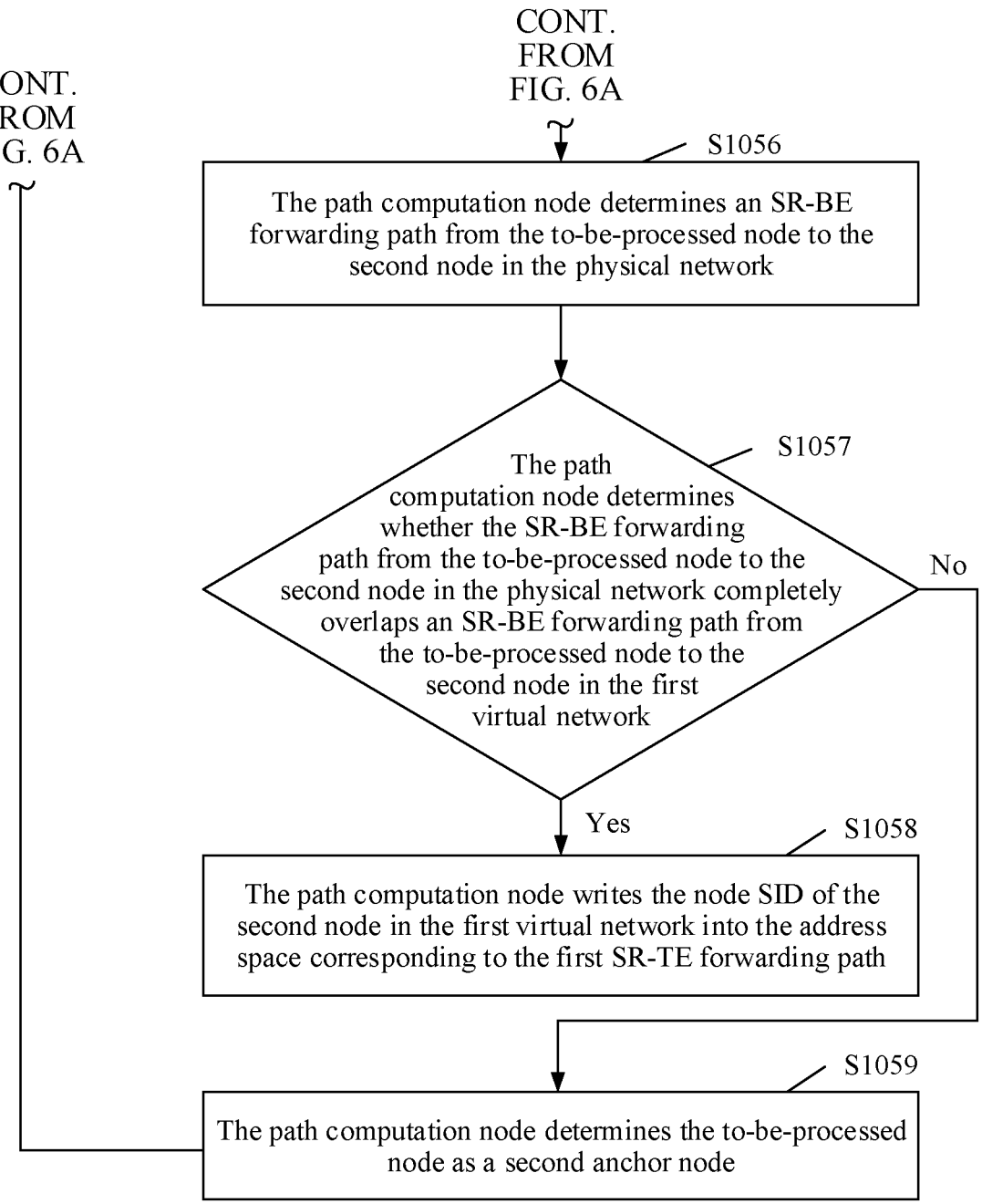

In this embodiment, as shown in FIG. 6A and FIG. 6B, S105 may be specifically implemented by using S1051 to S1059.

S1051. The path computation node determines nodes on the first SR-TE forwarding path.

The nodes on the first SR-TE forwarding path are the same as the nodes on the first SR-BE forwarding path. For example, if the first SR-BE forwarding path is A→B→C→F, the path computation node determines that the nodes on the first SR-TE forwarding path are successively A, B, C, and F.

S1052. The path computation node determines a to-be-processed node.

The to-be-processed node is the 1st node that is on an SR-BE forwarding path from a first anchor node to the second node in the first virtual network and that is not on an SR-BE forwarding path from the first anchor node to the second node in the physical network, and the first anchor node is a node in the first virtual network.

It should be noted that, in this embodiment, initially, the first anchor node is the first node.

S1053. The path computation node writes an adjacency SID of a link between a previous-hop node of the to-be-processed node and the to-be-processed node on the first SR-BE forwarding path into an address space corresponding to the first SR-TE forwarding path.

S1054. The path computation node determines whether the to-be-processed node is the second node.

To be specific, the path computation node determines whether the current to-be-processed node is the destination node of the data transmission in the first virtual network.

In this embodiment, if the to-be-processed node is the second node, the path computation node performs S1055. If the to-be-processed node is not the second node, the path computation node performs S1056.

S1055. The path computation node writes the node SID of the second node in the first virtual network into the address space corresponding to the first SR-TE forwarding path.

In this embodiment, the path computation node writes the adjacency SID of the link between the previous-hop node of the to-be-processed node and the to-be-processed node on the first SR-BE forwarding path into the address space corresponding to the first SR-TE forwarding path. The path computation node determines the first SR-TE forwarding path. In this way, the target forwarding path may be limited to pass through the link between the previous-hop node of the to-be-processed node and the to-be-processed node. For example, assuming that the to-be-processed node is a node C and a previous-hop node of the node C in the first virtual network is a node B, the path computation node writes an adjacency SID of a link between the node B and the node C into the address space. In this way, when data is forwarded through the first SR-TE forwarding path, the data needs to pass through the link between the node B and the node C.

S1056. The path computation node determines an SR-BE forwarding path from the to-be-processed node to the second node in the physical network.

S1057. The path computation node determines whether the SR-BE forwarding path from the to-be-processed node to the second node in the physical network completely overlaps an SR-BE forwarding path from the to-be-processed node to the second node in the first virtual network.

In this embodiment, if the SR-BE forwarding path from the to-be-processed node to the second node in the physical network completely overlaps the SR-BE forwarding path from the to-be-processed node to the second node in the first virtual network, the path computation node performs S1058. If the SR-BE forwarding path from the to-be-processed node to the second node in the physical network does not completely overlap the SR-BE forwarding path from the to-be-processed node to the second node in the first virtual network, the path computation node performs S1059.

S1058. The path computation node writes the node SID of the second node in the first virtual network into the address space corresponding to the first SR-TE forwarding path.

S1059. The path computation node determines the to-be-processed node as a second anchor node.

In this embodiment, the path computation node determines the to-be-processed node as a new anchor node, and the new anchor node may be referred to as the second anchor node. To be specific, the to-be-processed node updates an anchor node from the first anchor node to the second anchor node. The path computation node returns to S1052 for further execution. To be specific, a to-be-processed node and the like are further determined, until a to-be-processed node is the second node or the SR-BE forwarding path from the to-be-processed node to the second node in the physical network completely overlaps the SR-BE forwarding path from the to-be-processed node to the second node in the first virtual network, to obtain the first SR-TE forwarding path.

The address space corresponding to the first SR-TE forwarding path may be determined by cyclically performing S1052 to S1059. In the following embodiment, the method for determining the address space corresponding to the first SR-TE forwarding path described in S1052 to S1059 is mainly described by using several different examples.

It should be noted that, in this embodiment, in a process of cyclically performing S1052 to S1059, the anchor node is not fixed, and the anchor node may change. To be specific, the anchor node may be updated in a process of determining the first SR-TE forwarding path. For example, the anchor node is updated from the first anchor node to the second anchor node.

In a first example, the process of determining the address space corresponding to the first SR-TE forwarding path is described with reference to the first virtual network shown in FIG. 4b and the physical network shown in FIG. 5.

Corresponding to S1052, the first SR-BE forwarding path determined in the first virtual network is A→B→C→F, and the second SR-BE forwarding path in the physical network is A→B→E→F. In this embodiment, when S1052 is performed for the first time, the first anchor node is the node A, and the second node is the node F. The 1st node that is on the SR-BE forwarding path from the node A to the node F in the first virtual network and that is not on the SR-BE forwarding path from the node A to the node F in the physical network is the node C. Therefore, the node C is determined as the to-be-processed node.

Corresponding to S1053, the determined to-be-processed node is the node C, and a previous-hop node of the node C is the node B. In this case, the path computation node writes an adjacency SID of a link between the node B and the node C into the address space corresponding to the first SR-TE forwarding path. Assuming that the adjacency SID of the link between the node B and the node C is B:1::C1, B:1::C1 is written into the address space corresponding to the first SR-TE forwarding path. In this way, a part of an address in the address space corresponding to the first SR-TE forwarding path is A:1::→B:1::C1.

Corresponding to S1054, the node C is not the second node, that is, is not the destination node. In this case, S1056 is performed, the to-be-processed node is the node C, and the path computation node determines an SR-BE forwarding path from the node C to the node F in the physical network shown in FIG. 5. The SR-BE forwarding path from the node C to the node F is C→F.

Corresponding to S1057, because the SR-BE forwarding path from the to-be-processed node to the second node in the physical network determined in S1056 is C→F, and the SR-BE forwarding path from the to-be-processed node to the second node in the first virtual network is C→F, it can be learned that the two SR-BE forwarding paths completely overlap, and the path computation node is to perform S1058.

Corresponding to S1058, because it is determined that the two forwarding paths completely overlap in S1057, the path computation node continues to write the node SID of the destination node into the address space corresponding to the first SR-TE forwarding path, to be specific, writes the node SID of the node F into the address space corresponding to the first SR-TE forwarding path. If the path computation node determines the first SR-TE forwarding path, an address in the address space corresponding to the first SR-TE forwarding path is A:1::→B:1::C1→F:1::D100.

It may be understood that, in the first example, the path computation node performs S1058 to determine the address space corresponding to the first SR-TE forwarding path, and the path computation node no longer performs S1059.

In a second example, as shown in FIG. 7A and FIG. 7B, FIG. 7A is a schematic diagram of a topology of the physical network, and FIG. 7B is the first virtual network established over the physical network shown in FIG. 7A.

Corresponding to S1052, the first SR-BE forwarding path determined in the first virtual network is A→B→C→F, and the second SR-BE forwarding path in the physical network is A→B→E→F. In this embodiment, when S1052 is performed for the first time, the first anchor node is the node A, and the second node is the node F. The 1st node that is on the SR-BE forwarding path from the node A to the node F in the first virtual network and that is not on the SR-BE forwarding path from the node A to the node F in the physical network is the node C. Therefore, the node C is determined as the to-be-processed node.

Corresponding to S1053, the determined to-be-processed node is the node C, and a previous-hop node of the node C is the node B. In this case, the path computation node writes an adjacency SID of a link between the node B and the node C into the address space corresponding to the first SR-TE forwarding path. Assuming that the adjacency SID of the link between the node B and the node C is B:1::C1, B:1::C1 is written into the address space corresponding to the first SR-TE forwarding path. In this way, a part of an address in the address space corresponding to the first SR-TE forwarding path is A:1::→B:1::C1.

Corresponding to S1054, the node C is not the second node, that is, is not the destination node. In this case, S1056 is performed, the to-be-processed node is the node C, and the path computation node determines an SR-BE forwarding path from the node C to the node F in the physical network shown in FIG. 7A. It is assumed that the SR-BE forwarding path from the node C to the node F is C→H→F.

Corresponding to S1057, because the SR-BE forwarding path from the to-be-processed node to the second node in the physical network determined in S1056 is C→H→F, and the SR-BE forwarding path from the to-be-processed node to the second node in the first virtual network is C→E→F, it can be learned that the two SR-BE forwarding paths do not completely overlap, and the path computation node is to perform S1059.

Corresponding to S1059, the path computation node determines the to-be-processed node as the second anchor node. In other words, the path computation node determines the node C as the second anchor node. The path computation node continues to perform subsequent steps such as S1052.

The path computation node performs S1052 for the second time. In this case, the second anchor node is the node C, and the second node is the node F. The 1st node that is on an SR-BE forwarding path (namely, C→E→F) from the node C to the node F in the first virtual network and that is not on the SR-BE forwarding path (namely, C→H→F) from the node C to the node F in the physical network is the node E. Therefore, the node E is determined as the to-be-processed node.

Then, the path computation node performs S1053 for the second time, the determined to-be-processed node is the node E, and a previous-hop node of the node E is the node C. The path computation node continues to write an adjacency SID of a link between the node C and the node E into the address space corresponding to the first SR-TE forwarding path. Assuming that the adjacency SID of the link between the node C and the node E is C:1::C2, C:1::C2 is written into the address space corresponding to the first SR-TE forwarding path. In this way, a part of an address in the address space corresponding to the first SR-TE forwarding path is A:1::→B:1::C1→C:1::C2.

Further, the path computation node performs S1054 for the second time. In this case, the to-be-processed node is the node E and is not the second node, and S1056 is to be performed. The to-be-processed node is the node E. The path computation node determines an SR-BE forwarding path from the node E to the node F in the physical network shown in FIG. 7b. It is assumed that the SR-BE forwarding path from the node E to the node F is E→F. Corresponding to S1057, because the SR-BE forwarding path from the to-be-processed node to the second node in the physical network determined in S1056 is E→F, and the SR-BE forwarding path from the to-be-processed node to the second node in the first virtual network is E→F, it can be learned that the two SR-BE forwarding paths completely overlap, and the path computation node is to perform S1058.

The path computation node performs S1056 for the second time. Because it is determined that the two forwarding paths completely overlap in S1057, the path computation node continues to write the node SID of the destination node into the address space corresponding to the first SR-TE forwarding path, to be specific, writes the node SID of the node F into the address space corresponding to the first SR-TE forwarding path. If the path computation node determines the first SR-TE forwarding path, an address in the address space corresponding to the first SR-TE forwarding path is A:1::→B:1::C1→C:1::C1→F:1::D100.

It should be noted that, in this embodiment, for a more complex physical network and a more complex first virtual network, the steps S1052 to S1059 are still cyclically performed, to determine an address space corresponding to a final first SR-TE forwarding path. No example is provided herein.

In the two examples, SIDs written into the address space corresponding to the first SR-TE forwarding path are not all SIDs (including a node SID and an adjacent SID) on the first SR-TE forwarding path, but it is determined, by using the method in S1052 to S1059, that some necessary SIDs are written into the address space corresponding to the first SR-TE forwarding path. In this way, a relatively small label stack depth and relatively low forwarding path overheads can be achieved.

In this embodiment, if the path computation node is not a network controller but a start node in a network, in other words, if the path computation node is denoted as the first node, after the path computation node determines the target forwarding path, the path computation node generates a forwarding entry to the second node in the first virtual network. The forwarding entry includes the SRv6 LOC address information of the second node in the first virtual network and indication information of an outbound interface from the path computation node to a next-hop node of the path computation node in the first virtual network.

In this embodiment, a forwarding node in the first virtual network does not perform a complete path computation procedure (to be specific, S101 to S105), and the forwarding node (if a destination node is the forwarding node, a destination forwarding node is not included) in the first virtual network may perform interface replacement. Specifically, as shown in FIG. 8, the forwarding path determining method provided in this embodiment may include S201 and S202.

S201. After a first forwarding node obtains link status information of a physical network and link status information of a first virtual network, the first forwarding node replaces a first main interface between the first forwarding node and a next-hop node of the first forwarding node with a first sub-interface.

The first forwarding node is a forwarding node in the first virtual network. The first main interface is an interface between the first forwarding node and the next-hop node of the first forwarding node in the physical network, and the first sub-interface is an interface between the first forwarding node and the next-hop node of the first forwarding node in the first virtual network.

In this embodiment, the link status information of the physical network includes indication information of a main interface between two nodes in the physical network. The link status information of the first virtual network includes indication information of a sub-interface between two nodes in the first virtual network. Specifically, in S201, the link status information of the physical network that is obtained by the first forwarding node may include indication information of a main interface between the first forwarding node and another node, and the link status information of the first virtual network that is obtained by the first forwarding node may include indication information of a sub-interface between the first forwarding node and another node.

For other descriptions of the link status information of the physical network and the link status information of the first virtual network, refer to related descriptions in the foregoing embodiment. Details are not described herein again.

In this embodiment, because a forwarding node in the first virtual network does not perform path computation, and the forwarding node performs path computation in the physical network, the forwarding node does not perceive the virtual network, but perceives only the physical network. For the first forwarding node in the first virtual network, an interface between the first forwarding node and the next-hop node of the first forwarding node is a main interface (namely, the first main interface) by default. After obtaining the link status information of the physical network and the link status information of the first virtual network, the first forwarding node may replace the first main interface with the sub-interface (namely, the first sub-interface) between the first forwarding node and the next-hop node of the first forwarding node in the first virtual network. In this way, during data transmission in the first virtual network, the first forwarding node may transmit data to the next-hop node of the first forwarding node through the first sub-interface, so that it can be ensured that data in a virtual network is transmitted in the corresponding virtual network, to implement resource isolation and avoid interference between data transmission in different networks.

S202. The first forwarding node generates a forwarding entry to a second node in the first virtual network.

In this embodiment, in the first virtual network, after replacing the first main interface with the first sub-interface, the first forwarding node generates the forwarding entry to the second node (namely, a destination node) in the first virtual network. Therefore, the first forwarding node can transmit data on a target forwarding path based on the forwarding entry.

For example, the target forwarding path is a first SR-TE forwarding path A→B→C→F. Assuming that the node A, the node B, the node C, and the node F are all forwarding nodes, the first forwarding node may be the node A, the node B, or the node C (excluding the destination node F).

When the first forwarding node is the node A, the node A replaces an interface between the node A and the node B, and the node A generates a forwarding entry to the node F. The forwarding entry includes SRv6 LOC address information of the node F and indication information of an outbound interface corresponding to the node A. The outbound interface corresponding to the node A is a sub-interface that is between the node A and the node B and that corresponds to the first virtual network.

When the first forwarding node is the node B, the node B replaces an interface between the node B and the node C, and the node B generates a forwarding entry to the node F. The forwarding entry includes the SRv6 LOC address information of the node F and indication information of an outbound interface corresponding to the node B. The outbound interface corresponding to the node B is a sub-interface that is between the node B and the node C and that corresponds to the first virtual network.

When the first forwarding node is the node C, the node C replaces an interface between the node C and the node F, and the node C generates a forwarding entry to the node F. The forwarding entry includes the SRv6 LOC address information of the node F and indication information of an outbound interface corresponding to the node C. The outbound interface corresponding to the node C is a sub-interface that is between the node C and the node F and that corresponds to the first virtual network.

Optionally, with reference to FIG. 8, as shown in FIG. 9, S201 may be specifically implemented by using S2011 and S2012.

S2011. The first forwarding node determines whether the first sub-interface corresponding to the first main interface exists in the first virtual network.

In this embodiment, the first forwarding node determines, through searching based on the first main interface, whether the corresponding sub-interface (the first sub-interface) in the first virtual network is configured. If the first sub-interface is configured, the first forwarding node determines that the first sub-interface corresponding to the first main interface exists. If the first sub-interface is not configured, the first forwarding node determines that the first sub-interface corresponding to the first main interface does not exist.

S2012. If the first sub-interface exists, the first forwarding node replaces the first main interface between the first forwarding node and the next-hop node of the first forwarding node with the first sub-interface.

In an implementation, if the first sub-interface does not exist, the first forwarding node does not perform interface replacement, and the first forwarding node does not generate the forwarding entry to the second node, either. Optionally, the first forwarding node forwards, through the first main interface, data to be sent to the second node in the first virtual network.

Figure 10:
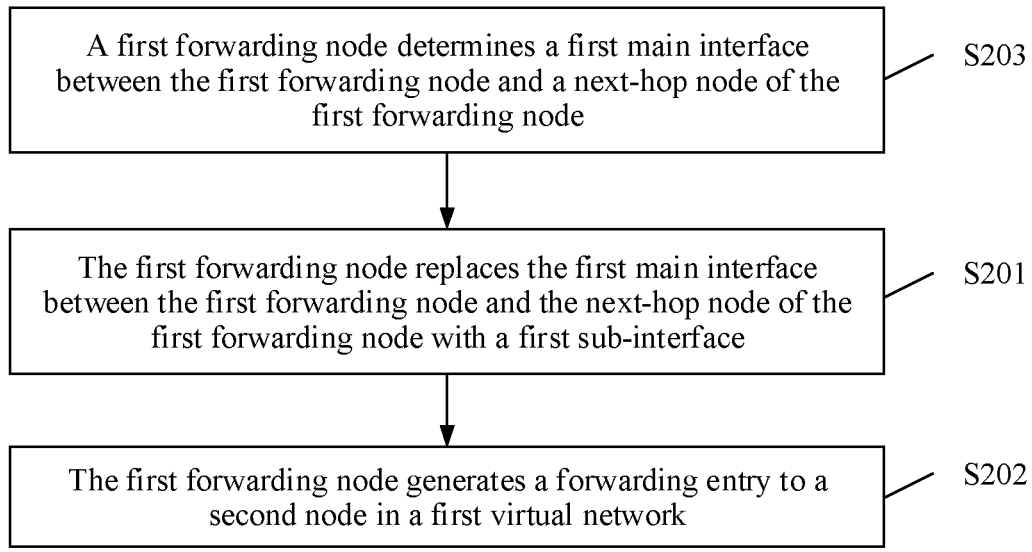
FIG. 10 is a schematic diagram 6 of a forwarding path determining method according to an embodiment.

Optionally, with reference to FIG. 8, as shown in FIG. 10, before S201, the method further includes S203.

S203. The first forwarding node determines the first main interface between the first forwarding node and the next-hop node of the first forwarding node.

Figure 11:
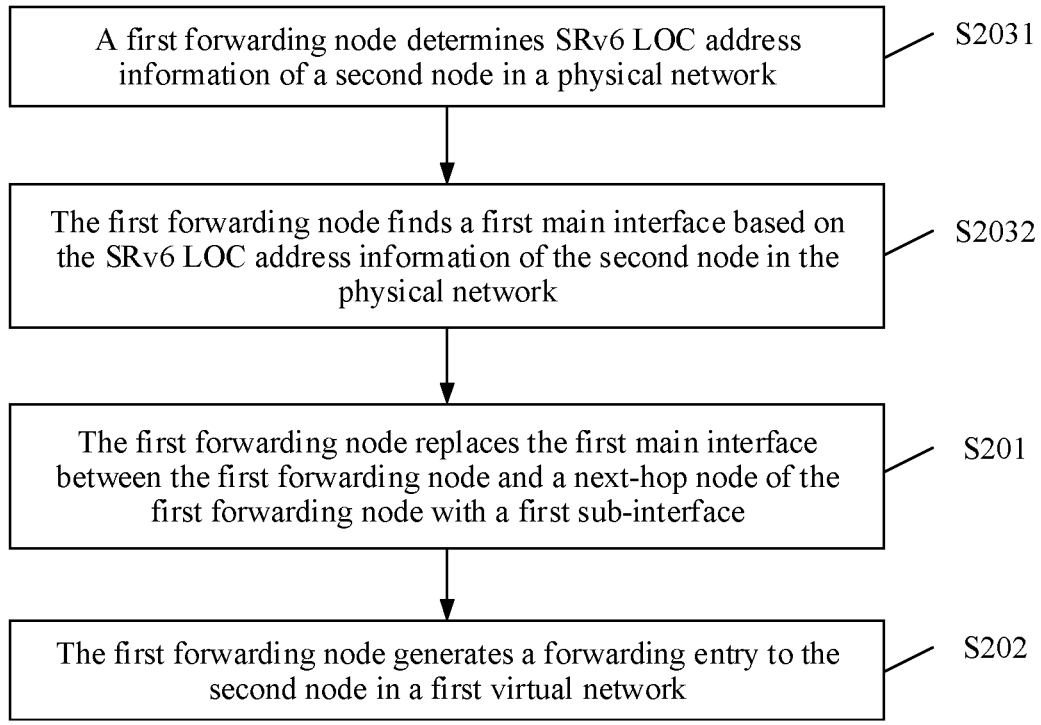
FIG. 11 is a schematic diagram 7 of a forwarding path determining method according to an embodiment.

With reference to FIG. 10, as shown in FIG. 11, S203 may be specifically implemented by S2031 and S2032.

S2031. The first forwarding node determines SRv6 LOC address information of the second node in the physical network.

In this embodiment, the first forwarding node first determines SRv6 LOC address information corresponding to the second node in the first virtual network, uses the SRv6 LOC address information as a thread to search for the SRv6 LOC address information, in the physical network, that corresponds to the second node and that matches the SRv6 LOC address information corresponding to the second node in the first virtual network.

S2032. The first forwarding node finds the first main interface based on the SRv6 LOC address information of the second node in the physical network.

In this embodiment, the first forwarding node may search a routing table for a corresponding outbound interface based on the SRv6 LOC address information of the second node in the physical network, to find the outbound interface that is of the first forwarding node and that corresponds to the second node. For example, assuming that the first forwarding node is the node A, and for the second node, a forwarding path from the first forwarding node to the second node is A→B→C→F, the first forwarding node searches for a main interface between the node A and the node B, namely, the first main interface.

Optionally, in an implementation, if the SRv6 LOC address information corresponding to the second node in the first virtual network is configured as a subset of the SRv6 LOC address information corresponding to the second node in the physical network, the first forwarding node may directly search a routing table for a corresponding outbound interface based on the SRv6 LOC address information corresponding to the second node in the first virtual network, to find the outbound interface (namely, the first main interface) that is of the first forwarding node and that corresponds to the second node.

It may be understood that, in this embodiment, after configuring the physical network and each virtual network, all forwarding nodes in the network may perform S201 and S202 to replace all interfaces, and generate a forwarding entry to a destination node in a virtual network. Therefore, after determining a target forwarding path, a path computation node forwards data based on a sub-interface obtained after the replacement. Alternatively, after computing a target forwarding path in the first virtual network, the path computation node replaces a main interface with a corresponding sub-interface in the first virtual network for a forwarding node on the target forwarding path, and then generates a forwarding entry to a destination node, for data forwarding.

In other words, in this embodiment, a sequence of performing S101 and S105 and S201 and S202 may not be limited. S101 and S105 may be performed before S201 and S202, or S201 and S202 may be performed before S101 and S105, or S101 to S105 and S201 to S202 may be simultaneously performed.

In conclusion, a target forwarding path is determined according to the forwarding path determining method provided in S101 to S105. When nodes in the first virtual network are some nodes in the physical network, or when links in the first virtual network are some links in the physical network, or when a link metric of the first virtual network is different from a link metric of the physical network, a problem that data cannot be completely forwarded in the first virtual network or a problem that data is incorrectly forwarded in the first virtual network caused due to an interface replacement failure or an interface replacement error can be avoided.

Figures 12A, 12B:
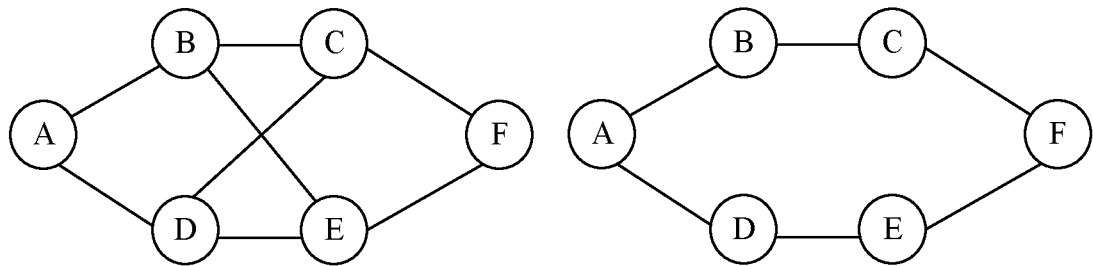
FIG. 12A and FIG. 12B are a schematic diagram 3 of network topologies according to an embodiment.

For example, as shown in FIG. 12A and FIG. 12B, a first virtual network shown in FIG. 12B is a network slice of a physical network shown in FIG. 12A. In the first virtual network, it is assumed that a path computation node is a network controller, and a first SR-BE forwarding path determined by the path computation node is A→B→C→F. In the physical network, a second SR-BE forwarding path determined by the path computation node is A→B→E→F.

In the physical network, for the node A, a next hop of the node A is the node B. After the node A determines a main interface between the node A and the node B, the node A searches for a sub-interface between the node A and the node B in the first virtual network. Therefore, the node A may complete interface replacement, and replace the interface between the node A and the node B in the first virtual network with the corresponding sub-interface in the first virtual network.

In the physical network, for the node B, a next hop of the node B is the node E. After the node B determines a main interface between the node B and the node E, the node B searches for a sub-interface between the node B and the node E in the first virtual network. However, because a link between the node B and the node E does not exist in the first virtual network, and the sub-interface between the node B and the node E is not configured, the sub-interface does not exist, and the node B does not perform interface replacement. Optionally, data corresponding to the first virtual network is still forwarded through the main interface between the node B and the node E.

In the physical network, for the node E, a next hop of the node E is the node F. After the node E determines a main interface between the node E and the node F, the node E searches for a sub-interface between the node E and the node F in the first virtual network. Therefore, the node E may complete interface replacement, and replace the interface between the node E and the node F in the first virtual network with the corresponding sub-interface in the first virtual network.

In conclusion, because the interface between the node B and the node E fails to be replaced, not all data in the first virtual network is forwarded in the first virtual network, but some data is forwarded in the physical network. According to the forwarding path determining method provided in this embodiment, when the first SR-BE forwarding path does not completely overlap the second SR-BE forwarding path, a first SR-TE forwarding path is determined as the target forwarding path, so that it can be ensured that data corresponding to a virtual network can be forwarded in the virtual network.

Figures 13A, 13B:
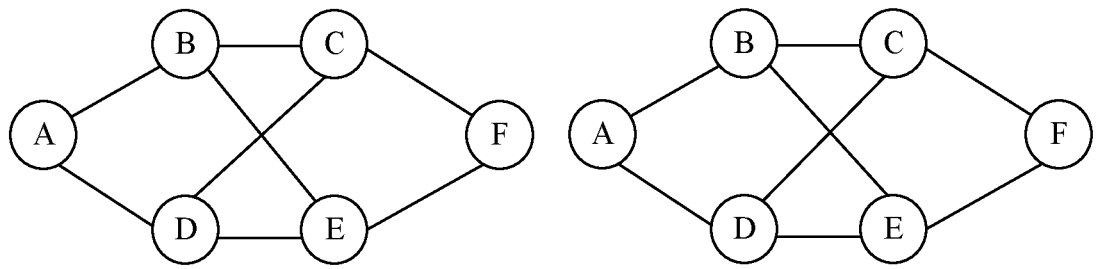
FIG. 13A and FIG. 13B are a schematic diagram 4 of network topologies according to an embodiment.

For another example, as shown in FIG. 13A and FIG. 13B, a first virtual network shown in FIG. 13B is a network slice of a physical network shown in FIG. 13A. In the first virtual network, it is assumed that a path computation node is a network controller, and a first SR-BE forwarding path determined by the path computation node is A→B→C→F. In the physical network, a second SR-BE forwarding path determined by the path computation node is A→B→E→F.

In the physical network, for the node A, a next hop of the node A is the node B. After the node A determines a main interface between the node A and the node B, the node A searches for a sub-interface between the node A and the node B in the first virtual network. Therefore, the node A may complete interface replacement, and replace the interface between the node A and the node B in the first virtual network with the corresponding sub-interface in the first virtual network.

In the physical network, for the node B, a next hop of the node B is the node E. After the node B determines a main interface between the node B and the node E, the node B searches for a sub-interface between the node B and the node E in the first virtual network, the node B finds that the sub-interface between the node B and the node E exists in the first virtual network. Therefore, the node B may complete interface replacement, and replace the interface between the node B and the node E in the first virtual network with the corresponding sub-interface in the first virtual network. However, on the forwarding path determined in the first virtual network, a next hop of the node B is the node C rather than the node E. Although data may be forwarded in the first virtual network, the data is not forwarded according to a shortest path (A→B→C→F is the shortest path).

In the physical network, for the node E, a next hop of the node E is the node F. After the node E determines a main interface between the node E and the node F, the node E searches for a sub-interface between the node E and the node F in the first virtual network. Therefore, the node E may complete interface replacement, and replace the interface between the node E and the node F in the first virtual network with the corresponding sub-interface in the first virtual network.

In conclusion, because the interface between the node B and the next-hop node of the node B is incorrectly replaced, an error occurs during data forwarding in the first virtual network, and the data is not forwarded according to an expected shortest path. According to the forwarding path determining method provided in this embodiment, when the first SR-BE forwarding path does not completely overlap the second SR-BE forwarding path, a first SR-TE forwarding path is determined as the target forwarding path, so that it can be ensured that data corresponding to a virtual network can be forwarded on a shortest path in the virtual network.

According to the forwarding path determining method provided in the embodiments, after establishing the first virtual network (which may be a network slice) and configuring the network slice, in a process of determining the forwarding path in the first virtual network, the path computation node in the first virtual network determines the first SR-BE forwarding path from the first node to the second node in the first virtual network, and the path computation node also determines the second SR-BE forwarding path from the first node to the second node in the physical network. The path computation node determines the target forwarding path from the first node to the second node by determining, through comparing, whether the two forwarding paths completely overlap. When the first SR-BE forwarding path completely overlaps the second SR-BE forwarding path, the path computation node determines the first SR-BE forwarding path as the target forwarding path from the first node to the second node. Alternatively, when the first SR-BE forwarding path does not completely the second SR-BE forwarding path, the path computation node determines the first SR-TE forwarding path according to the physical network and the first virtual network, and determines the first SR-TE forwarding path as the target forwarding path from the first node to the second node. In addition, the forwarding nodes in the first virtual network replace interfaces between nodes. For one (referred to as the first forwarding node) of the forwarding nodes, the first forwarding node determines to replace the first main interface between the first forwarding node and the next-hop node of the first forwarding node with the first sub-interface. The first main interface is an interface between the first forwarding node and the next-hop node of the first forwarding node in the physical network, and the first sub-interface is an interface between the first forwarding node and the next-hop node of the first forwarding node in the first virtual network. In this way, forwarding path computation is completed. It can be learned that only the path computation node in the first virtual network determines the forwarding path, and the forwarding node in the first virtual network does not determine a complete forwarding path, but generates the forwarding entry to the destination node in the corresponding network slice through sub-interface replacement. In this way, the technical solution provided in the embodiments can reduce a computation amount of the forwarding node, and ensure forwarding performance of the forwarding node.

The foregoing mainly describes the solutions provided in the embodiments from a perspective of the nodes. It can be understood that to implement the foregoing functions, the nodes such as the path computation node and the forwarding node include a corresponding hardware structure and/or a corresponding software module that perform/performs the functions. A person skilled in the art should easily be aware that, in combination with the example units, algorithms, and steps described in the embodiments disclosed in this specification, the embodiments may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments, the path computation node, the forwarding node, and the like may be divided into function modules based on the foregoing method examples. For example, each function module may be obtained through division based on each corresponding function, or two or more functions may be integrated into one processing module. The integrated module may be implemented in the form of hardware, or may be implemented in the form of a software function module. It should be noted that, in the embodiments, division into the modules is used as an example, and is merely logical function division. In an actual implementation, another division manner may be used.

Figure 14:
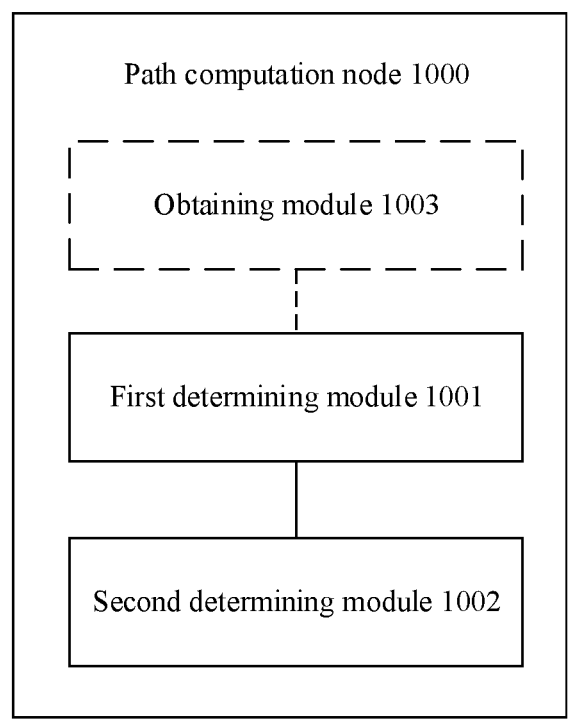
FIG. 14 is a schematic structural diagram 1 of a path computation node according to an embodiment.

When each function module is obtained through division based on each corresponding function, FIG. 14 is a possible schematic structural diagram of a path computation node in the foregoing embodiments. As shown in FIG. 14, a path computation node 1000 may include a first determining module 1001 and a second determining module 1002. The first determining module 1001 may be configured to support the path computation node 1000 in performing S101 (including S1011 and S1012) and S102 (including S1021 and S1022) in the foregoing method embodiments. The second determining module 1002 may be configured to support the path computation node 1000 in performing S103, S104, and S105 (including S1051 to S1059) in the foregoing method embodiments.

Optionally, as shown in FIG. 14, the path computation node 1000 may further include an obtaining module 1003. The obtaining module 1003 may be configured to support the path computation node 1000 in performing S100a and S100b in the foregoing method embodiments. All related content of the steps in the foregoing method embodiments may be cited in function descriptions of corresponding function modules. Details are not described herein again.

Figure 15:
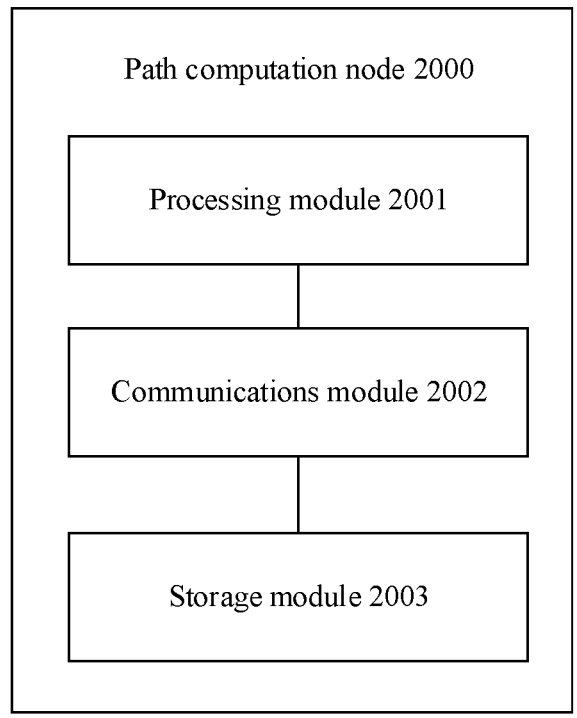
FIG. 15 is a schematic structural diagram 2 of a path computation node according to an embodiment.

When an integrated unit is used, FIG. 15 is a possible schematic structural diagram of the path computation node in the foregoing embodiment. As shown in FIG. 15, a path computation node 2000 may include a processing module 2001 and a communications module 2002. The processing module 2001 may be configured to control and manage an action of the path computation node 2000. For example, the processing module 2001 may be configured to support the path computation node 2000 in performing S101 to S105 in the foregoing method embodiments and/or another process of the technology described in this specification. S101 includes S1011 and S1012, S102 includes S1021 and S1022, and S105 includes S1051 to S1059. The communications module 2002 may be configured to support the path computation node 2000 in communicating with another network entity.

Optionally, as shown in FIG. 15, the path computation node 2000 may further include a storage module 2003 configured to store program code and data of the path computation node 2000.

The processing module 2001 may be a processor or a controller, such as a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processing module 2001 may implement or execute various example logical blocks, modules, and circuits described with reference to content disclosed in the embodiments. The processor may alternatively be a combination of processors implementing a computing function, for example, a combination of one or more microprocessors, or a combination of a DSP and a microprocessor. The communications module 2002 may be a transceiver, a transceiver circuit, a communications interface, or the like. The storage module 2003 may be a memory.

When the processing module 2001 is the processor, the communications module 2002 is the transceiver, and the storage module 2003 is the memory, the processor, the transceiver, and the memory may be connected through a bus. The bus may be a Peripheral Component Interconnect (PCI) bus, an Extended Industry Standard Architecture (EISA) bus, or the like. The bus may be classified into an address bus, a data bus, a control bus, and the like.

Figure 16:
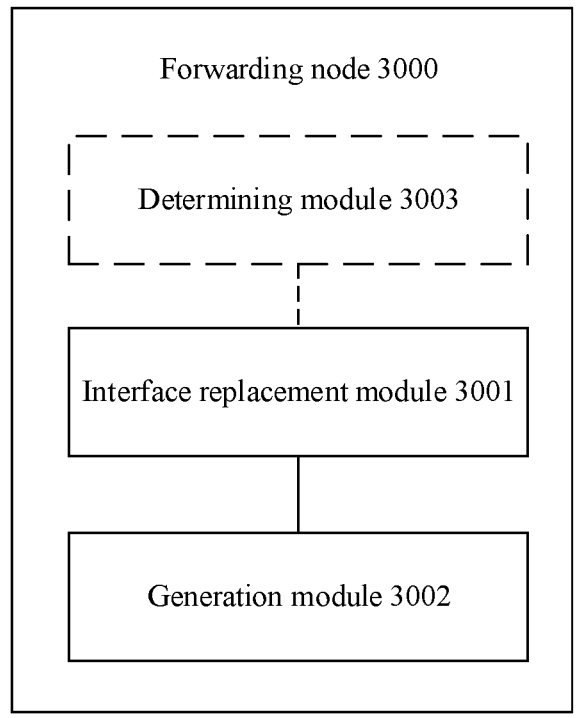
FIG. 16 is a schematic structural diagram 1 of a forwarding node according to an embodiment.

When each function module is obtained through division based on each corresponding function, FIG. 16 is a possible schematic structural diagram of a forwarding node in the foregoing embodiment. As shown in FIG. 16, a forwarding node 3000 may include an interface replacement module 3001 and a generation module 3002. The interface replacement module 3001 may be configured to support the forwarding node 3000 in performing S201 in the foregoing method embodiments. The determining module 3002 may be configured to support the forwarding node 3000 in performing S202 (including S2011 and S2012) in the foregoing method embodiments.

Optionally, as shown in FIG. 16, the forwarding node 3000 may further include a determining module 3003. The determining module 3003 may be configured to support the forwarding node 3000 in performing S203 (including S2031 and S2032) in the foregoing method embodiments. All related content of the steps in the foregoing method embodiments may be cited in function descriptions of corresponding function modules. Details are not described herein again.

Figure 17:
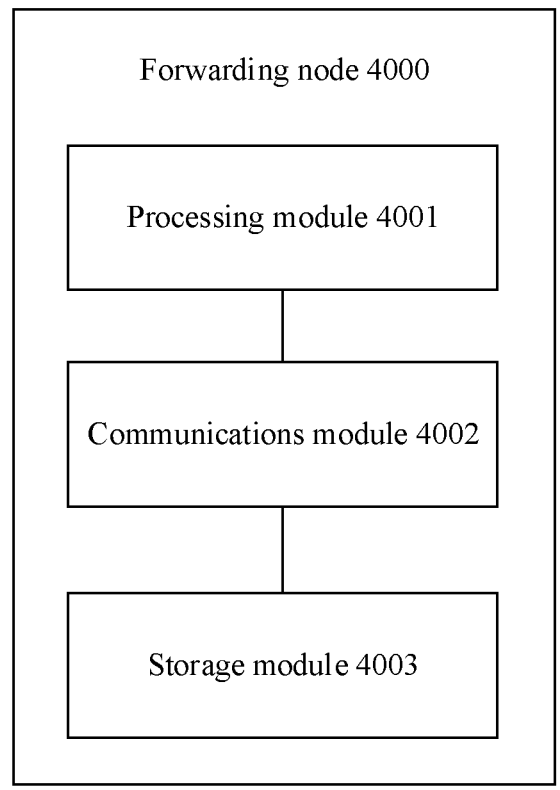
FIG. 17 is a schematic structural diagram 2 of a forwarding node according to an embodiment.

When an integrated unit is used, FIG. 17 is a possible schematic structural diagram of the forwarding node in the foregoing embodiment. As shown in FIG. 17, a forwarding node 4000 may include a processing module 4001 and a communications module 4002. The processing module 4001 may be configured to control and manage an action of the forwarding node 4000. For example, the processing module 4001 may be configured to support the forwarding node 4000 in performing S201 to S203 in the foregoing method embodiments. S202 includes S2011 and S2012, and S203 includes S2031 and S2032. The communications module 4002 may be configured to support the forwarding node 4000 in communicating with another network entity.

Optionally, as shown in FIG. 17, the forwarding node 4000 may further include a storage module 4003 configured to store program code and data of the forwarding node 4000.

The processing module 4001 may be a processor or a controller, for example, may be a CPU, a general purpose processor, a DSP, an ASIC, an FPGA, or another programmable logic device, a transistor logic device, a hardware component, or any combination thereof. The processing module 4001 may implement or execute various example logical blocks, modules, and circuits described with reference to content disclosed in the embodiments. The processor may alternatively be a combination of processors implementing a computing function, for example, a combination of one or more microprocessors, or a combination of a DSP and a microprocessor. The communications module 4002 may be a transceiver, a transceiver circuit, a communications interface, or the like. The storage module 4003 may be a memory.

When the processing module 4001 is the processor, the communications module 4002 is the transceiver, and the storage module 4003 is the memory, the processor, the transceiver, and the memory may be connected through a bus. The bus may be a PCI bus, an EISA bus, or the like. The bus may be classified into an address bus, a data bus, a control bus, and the like.

Figure 18:
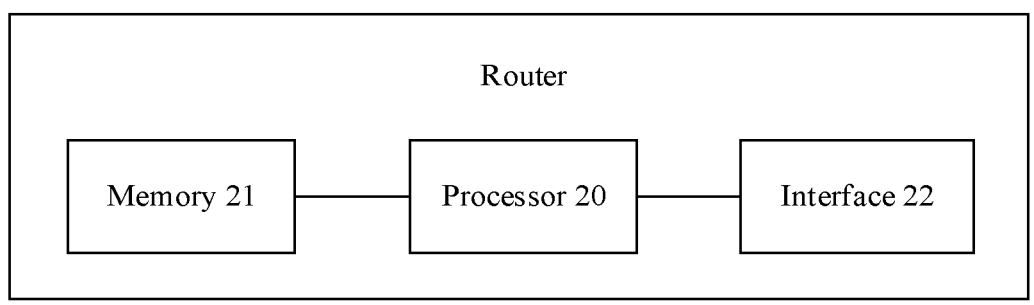
FIG. 18 is a schematic diagram of hardware of a router according to an embodiment.

The path computation node and the forwarding node provided in the embodiments may be a switch or a router. An example in which both the path computation node and the forwarding node are routers is used to describe hardware structures of the path computation node and the forwarding node. FIG. 18 is a schematic hardware diagram of a router according to an embodiment. As shown in FIG. 18, the router provided in this embodiment includes components such as a processor 20, a memory 21, and an interface 22. The components of the router are illustrated below.

The processor 20 is configured to be responsible for exchanging routing information, searching a routing table, and forwarding a data packet, for example, processing various tables for maintaining a router and performing a routing operation.

Optionally, the processing module 2001 in FIG. 15 may be the processor 20, and the processor 20 may perform related steps performed by the processing module 2001. The processing module 4001 in FIG. 17 may be the processor 20, and the processor 20 may perform related steps performed by the processing module 4001. Details are not described herein again.

The memory 21 is configured to store a configuration, an operating system, routing protocol software, and the like of the router. The router may have a plurality of types of memories, such as a read-only memory (ROM), a random-access memory (RAM), a dynamic ram (DRAM), and a flash memory.

Optionally, the storage module 2003 in FIG. 15 may be the memory 21. The storage module 4003 in FIG. 17 may also be the memory 21.

The interface 22 is used by the router to send and receive data packets. The interface 22 in the router includes a local area network interface and a wide area network interface. In addition, the router does not have an input device or a terminal display device. The router interface further includes a control port, which is used by a user or an administrator to communicate with the router through the terminal, to complete router configuration.

Optionally, the communications module 2002 in FIG. 15 may be the interface 22. The communications module 4002 in FIG. 17 may also be the interface 22.

All or some of the foregoing embodiments may be implemented through software, hardware, firmware, or any combination thereof. When a software program is used to implement the embodiments, all or some of the embodiments may be implemented in the form of a computer program product. The computer program product includes one or more computer instructions. When the computer instruction is loaded and executed on a computer, all or some of the procedures or functions according to the embodiments are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a Digital Video Disc (DVD)), a semiconductor medium (for example, a solid-state drive (SSD)), or the like.

According to the foregoing descriptions of the implementations, a person skilled in the art may clearly understand that, for the purpose of convenient and brief description, only division into the foregoing function modules is used as an example for description. In actual application, the foregoing functions may be allocated to different function modules and implemented based on a requirement. In other words, an inner structure of an apparatus includes different function modules, to implement all or some of the functions described above. For a detailed working process of the foregoing system, apparatus, and unit, refer to a corresponding process in the foregoing method embodiments, and details are not described herein again.

In the several embodiments provided, it may be understood that the disclosed system, apparatus, and method may be implemented in other manners. For example, the foregoing apparatus embodiments are merely an example. For example, the module or unit division is merely logical function division. In an actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software function unit and sold or used as an independent product, the integrated unit may be stored in a computer readable storage medium. Based on such an understanding, the technical solutions may be implemented in the form of a software product. The computer software product is stored in a storage medium and includes several instructions for instructing a computer device (which may be a personal computer, a server, or a network device) or a processor to perform all or some of the steps of the method according to the embodiments. The foregoing storage medium includes: any medium that can store program code, such as a flash memory, a removable hard disk, a read-only memory, a random access memory, a magnetic disk, or a compact disc.

The foregoing descriptions are merely specific implementations, but are not intended to limit the protection scope of this disclosure. Any variation or replacement within the technical scope disclosed shall fall within the protection scope of this disclosure. Therefore, the protection scope of this disclosure shall be subject to the protection scope of the claims.

What is claimed is:

1. A method implemented by a path computation node and comprising:
   determining a first segment routing-best effort (SR-BE) forwarding path from a first node to a second node in a first virtual network, wherein the first node is a start node of data transmission, and wherein the second node is a destination node of the data transmission;
   determining a second SR-BE forwarding path from the first node to the second node in a physical network, wherein the first virtual network is over the physical network; and
   determining, when the first SR-BE forwarding path completely overlaps the second SR-BE forwarding path, the first SR-BE forwarding path as a target forwarding path; or when the first SR-BE forwarding path does not completely overlap the second SR-BE forwarding path:
      determining a first segment routing-traffic engineering (SR-TE) forwarding path according to the physical network and the first virtual network, and
      determining the first SR-TE forwarding path as the target forwarding path.

2. The method of claim 1, wherein the first virtual network is a network slice over the physical network.

3. The method of claim 1, wherein the path computation node and the first node are the same or the path computation node is a network control node that interworks with the first node.

4. The method of claim 1, further comprising obtaining link status information of the first virtual network, wherein the link status information determines the target forwarding path and comprises a link metric of the first virtual network, a first node segment identifier (SID) of a node in the first virtual network, and an adjacency SID of a link in the first virtual network.

5. The method of claim 4, wherein determining the first SR-BE forwarding path comprises:
   determining nodes on the first SR-BE forwarding path based on the link metric; and
   writing a second node SID of the second node in the first virtual network into a first address space corresponding to the first SR-BE forwarding path.

6. The method of claim 5, wherein determining the first SR-TE forwarding path comprises:
   determining nodes on the first SR-TE forwarding path that are the same as the nodes on the first SR-BE forwarding path;
   determining a to-be-processed node that is the first on a third SR-BE forwarding path from a first anchor node to the second node in the first virtual network and that is not on a fourth SR-BE forwarding path from the first anchor node to the second node in the physical network, wherein the first anchor node is in the first virtual network;
   writing an adjacency SID of a link between a previous-hop node of the to-be-processed node and the to-beprocessed node on the first SR-BE forwarding path into a second address space corresponding to the first SR-TE forwarding path; and writing, when the to-be-processed node is the second node, the second node SID in the first virtual network into the second address space.

7. The method of claim 6, wherein when the to-be-processed node is not the second node, the method further comprises:
determining a fifth SR-BE forwarding path from the to-be-processed node to the second node in the physical network; and
writing, when the fifth SR-BE forwarding path completely overlaps a sixth SR-BE forwarding path from the to-be-processed node to the second node in the first virtual network, the second node SID in the first virtual network into the second address space.

8. The method of claim 7, wherein when the fifth SR-BE forwarding path does not completely overlap the sixth SR-BE forwarding path, the method further comprises:
determining the to-be-processed node as a second anchor node;
determining the to-be-processed node is the first on the sixth SR-BE forwarding path and is not on the fifth SR-BE forwarding path; and
writing, when the to-be-processed node is the second node, the second node SID into the second address space.

9. A method implemented by a first forwarding node and comprising:
obtaining first link status information of a physical network and second link status information of a first virtual network;
replacing a first main interface between the first forwarding node and a next-hop node of the first forwarding node with a first sub-interface, wherein the first main interface is between the first forwarding node and the next-hop node in the physical network, wherein the first sub-interface is between the first forwarding node and the next-hop node in the first virtual network, and wherein the first virtual network is over the physical network; and
generating a forwarding entry to a second node in the first virtual network,
wherein the forwarding entry comprises indication information of the first sub-interface, and
wherein the second node is a destination node of data transmission.

10. The method of claim 9, wherein the first virtual network is a network slice over the physical network.

11. The method of claim 9, wherein replacing the first main interface comprises:
determining whether the first sub-interface exists in the first virtual network; and
replacing, when the first sub-interface exists, the first main interface with the first sub- interface.

12. The method of claim 9, wherein before replacing the first main interface, the method further comprises determining the first main interface.

13. The method of claim 12, wherein determining the first main interface comprises:
determining Segment Routing over Internet Protocol version 6 (SRv6) locator (LOC) address information of the second node in the physical network; and
finding the first main interface based on the SRv6 LOC address information.

14. The method of claim 9, wherein the first link status information comprises first indication information of a main interface between two nodes in the physical network, and wherein the second link status information comprises second indication information of a sub-interface between two nodes in the first virtual network.

15. A path computation node comprising:
a memory configured to store instructions; and
a processor coupled to the memory and configured to execute the instructions to:
determine a first segment routing-best effort (SR-BE) forwarding path from a first node to a second node in a first virtual network, wherein the first node is a start node of data transmission, and wherein the second node is a destination node of the data transmission;
determine a second SR-BE forwarding path from the first node to the second node in a physical network, wherein the first virtual network is over the physical network; and
determine, when the first SR-BE forwarding path completely overlaps the second SR-BE forwarding path, the first SR-BE forwarding path as a target forwarding path; or when the first SR-BE forwarding path does not completely overlap the second SR-BE forwarding path:
determine a first segment routing-traffic engineering (SR-TE) forwarding path according to the physical network and the first virtual network, and
determine the first SR-TE forwarding path as the target forwarding path.

16. The path computation node of claim 15, wherein the first virtual network is a network slice over the physical network.

17. The path computation node of claim 15, wherein the path computation node and the first node are the same or the path computation node is a network control node that interworks with the first node.

18. The path computation node of claim 15, wherein the processor is further configured to execute the instructions to obtain link status information of the first virtual network, wherein the link status information determines the target forwarding path and comprises a link metric of the first virtual network, a first node segment identifier (SID) of a node in the first virtual network, and an adjacency SID of a link in the first virtual network.

19. The path computation node of claim 18, wherein the processor is further configured to execute the instructions to:
determine nodes on the first SR-BE forwarding path based on the link metric; and
write a second node SID of the second node in the first virtual network into a first address space corresponding to the first SR-BE forwarding path.

20. The path computation node of claim 19, wherein the processor is further configured to execute the instructions to:
determine nodes on the first SR-TE forwarding path that are the same as the nodes on the first SR-BE forwarding path;
determine a to-be-processed node that is the first on a third SR-BE forwarding path from a first anchor node to the second node in the first virtual network and that is not on a fourth SR-BE forwarding path from the first anchor node to the second node in the physical network, wherein the first anchor node is in the first virtual network;
write an adjacency SID of a link between a previous-hop node of the to-be-processed node and the to-be-processed node on the first SR-BE forwarding path into a second address space corresponding to the first SR-TE forwarding path; and write, when the to-be-processed node is the second node, the second node SID in the first virtual network into the second address space.

* * * * *